US010652632B2

(12) United States Patent
Webster et al.

(10) Patent No.: US 10,652,632 B2
(45) Date of Patent: May 12, 2020

(54) SEAMLESS AUGMENTED USER-GENERATED CONTENT FOR BROADCAST MEDIA

(71) Applicant: Vivoom, Inc., Boston, MA (US)

(72) Inventors: John Clayton Webster, Flemington, NJ (US); Katherine Hays, Boston, MA (US)

(73) Assignee: Vivoom, Inc., Boston, MA (US)

( * ) Notice: Subject to any disclaimer, the term of this patent is extended or adjusted under 35 U.S.C. 154(b) by 0 days.

(21) Appl. No.: 16/126,995

(22) Filed: Sep. 10, 2018

(65) Prior Publication Data
US 2019/0082239 A1   Mar. 14, 2019

Related U.S. Application Data

(60) Provisional application No. 62/557,271, filed on Sep. 12, 2017.

(51) Int. Cl.

| | |
|---|---|
| *G06F 3/00* | (2006.01) |
| *G06F 13/00* | (2006.01) |
| *H04N 5/445* | (2011.01) |
| *H04N 21/858* | (2011.01) |
| *H04N 21/485* | (2011.01) |
| *H04N 21/8545* | (2011.01) |
| *H04H 20/93* | (2008.01) |
| *H04N 21/2343* | (2011.01) |
| *H04H 20/38* | (2008.01) |
| *H04N 21/234* | (2011.01) |

(Continued)

(52) U.S. Cl.
CPC ........ *H04N 21/8586* (2013.01); *H04H 20/38* (2013.01); *H04H 20/93* (2013.01); *H04N 21/2343* (2013.01); *H04N 21/23424* (2013.01); *H04N 21/2743* (2013.01); *H04N 21/4854* (2013.01); *H04N 21/4858* (2013.01); *H04N 21/8545* (2013.01); *H04N 21/2187* (2013.01)

(58) Field of Classification Search
CPC ......... H04N 21/8586; H04N 21/23424; H04N 21/2343; H04N 21/2743; H04N 21/4854; H04N 21/4858; H04N 21/8545; H04N 21/2187

See application file for complete search history.

(56) References Cited

U.S. PATENT DOCUMENTS

| | | |
|---|---|---|
| 8,667,016 B2 | 3/2014 | Sims et al. |
| 8,935,611 B2 | 1/2015 | Oberbrunner et al. |

(Continued)

*Primary Examiner* — Mulugeta Mengesha
(74) *Attorney, Agent, or Firm* — Perkins Coie LLP

(57) ABSTRACT

The disclosed technology can seamlessly integrate consumers into a broadcaster's products and may seamlessly add broadcaster products to their consumer's social sharing. This technology allows broadcasters to define rules for filtering and modifying myriad user-generated content to be suitable for seamless integration in broadcast media. A broadcaster interface allows the broadcaster to select user-generated content in real-time for use within the broadcast presentation. The technology can accomplish this by receiving multiple pieces of user-generated content; curating the user-generated content with ratings, categorizations, or tags; verifying suitability of the user-generated content for broadcast media; and applying broadcaster-defined rules to modify eligible pieces of user-generated content into a form suitable for inclusion in broadcast media.

20 Claims, 6 Drawing Sheets

(51) Int. Cl.
*H04N 21/2743* (2011.01)
*H04N 21/2187* (2011.01)

(56) References Cited

U.S. PATENT DOCUMENTS

| | | | |
|---|---|---|---|
| 2012/0192220 A1* | 7/2012 | Wyatt | G06Q 30/0275 |
| | | | 725/30 |
| 2012/0192239 A1* | 7/2012 | Harwell | H04N 21/2343 |
| | | | 725/109 |
| 2015/0117839 A1 | 4/2015 | Oberbrunner et al. | |
| 2015/0294367 A1 | 10/2015 | Oberbrunner et al. | |
| 2017/0098255 A1 | 4/2017 | Miller et al. | |

\* cited by examiner

SEAMLESS AUGMENTED USER-GENERATED CONTENT FOR BROADCAST MEDIA

CROSS-REFERENCE TO RELATED APPLICATIONS

This application claims priority to U.S. Provisional Patent Application No. 62/557,271, titled "Seamless Augmented User-Generated Content for Broadcast Media," which is herein incorporated by reference in its entirety.

TECHNICAL FIELD

The present disclosure is directed to augmenting user-generated content for broadcast media. More specifically, the present disclosure is directed to a platform for broadcast systems to supply rules for filtering user-generated content and transforming the user-generated content into a format suitable for broadcast presentation.

DETAILED DESCRIPTION

Figure 1:
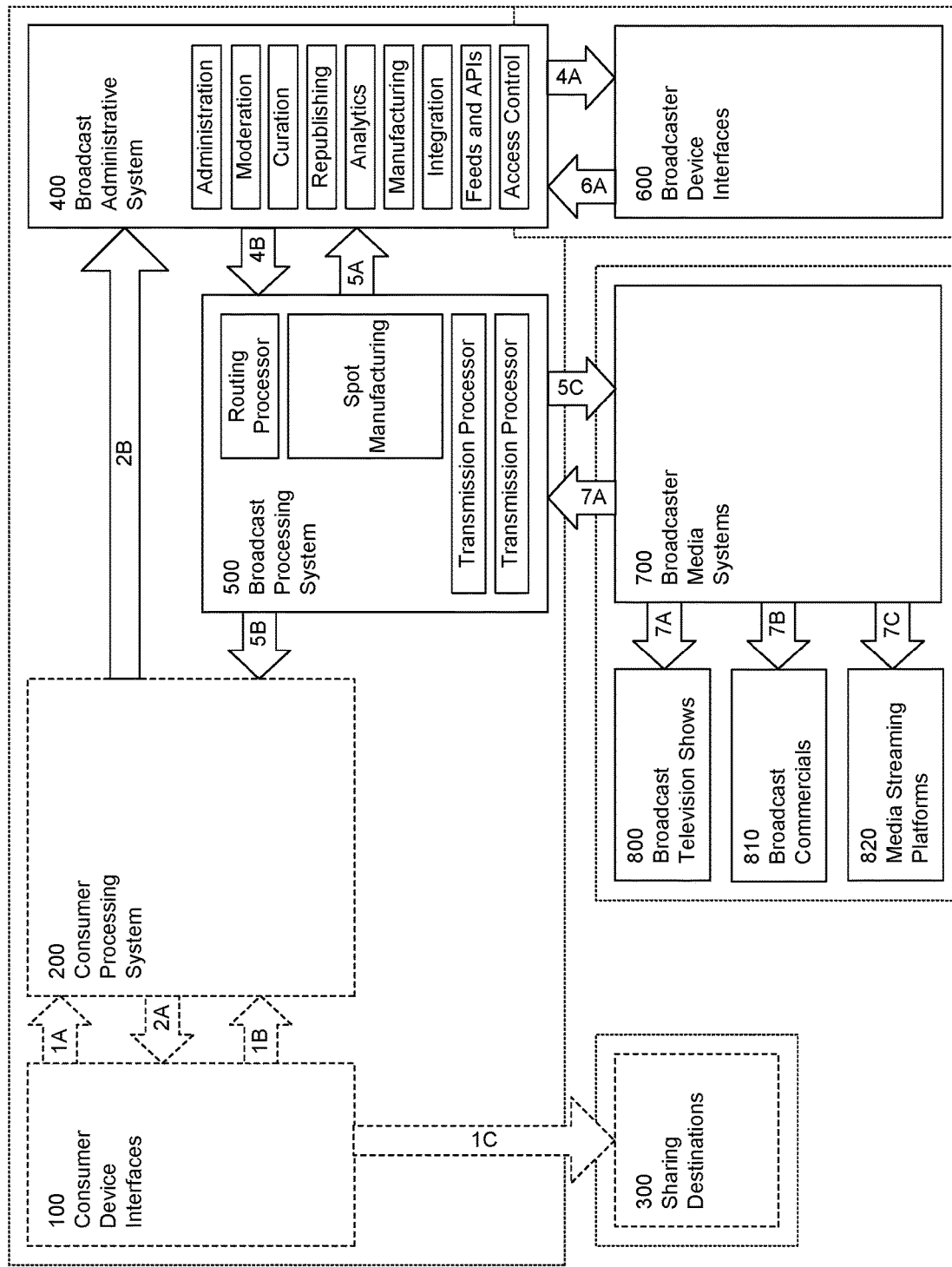
FIG. 1 is a block diagram illustrating example systems and process flows of the disclosed technology to seamlessly integrate user-generated content into broadcast media systems.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one-way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Various examples will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

A "user" includes a "consumer" with or without any direct ties to a broadcaster, outside of being interested in brands and/or programming the broadcaster provides or programming time the broadcaster provides. Representative subsets of "users" who generate and provide content in this technology may be considered "fans" of a television show, streaming program, commercial brand, etc. Users may be present at a venue or located anywhere. Users may be restricted from participating through access codes, geo-location, etc.

"Content" which users generate or provide in "user-generated content", may take the form of video, audio, photos, artwork, comments, messages, tagging, etc., including combining one or more of these forms.

A "broadcaster" may typically be a media company or an individual at a media company responsible for television, and/or streaming programming (though in some contexts, an automation, robot, expert system, or artificial intelligence may perform certain functions, such as automated sale and scheduling of content and ads). A "broadcaster" may also encompass $3^{rd}$ party recording, television, radio, satellite, podcasting, film studios, independent agencies, or advertisers, etc. who provide content to the television or streaming programming. The "broadcaster" may also be applied to advertising or scheduled media content appearing in movie theatres and concert venues where user-generated content may be meaningfully added to the experience and where the seamless integration of that content, outside of this technology, would require undue time and human investment. Other forms of broadcasting are of course possible.

"Broadcast media" may include live, near real-time, or pre-recorded programming, which a "broadcaster" provides to its consumers.

"User-Generated Content" is abbreviated "UGC".

"Application Programming Interface" is abbreviated "API".

"Spot Media" refers to the large class of files and formats which are manufactured Content to be used and directly integrated into broadcaster systems. In some implementations these may be video clips, entire video or audio commercials, segments of a television credit reel, background elements in live television, etc. In common implementations, this Content may be highly augmented.

As background, according to Nielsen from 2010 to 2017, time spent watching traditional television per month, in hours, is down 47% for persons between the age of 25 and 34, and down 50% for those age 2-17, and down 53% for persons ages 18-24. Those who consume broadcast products frequently tune out during the show itself and during television commercial breaks (source: Facebook activity data). As a result, broadcasters are seeing declines in ratings and advertising revenue.

As an overview, the disclosed technology may seamlessly integrate consumers into a broadcaster's products and may seamlessly add broadcaster products to their consumer's social sharing. This seeks to provide broadcasters a way to keep their broadcast products relevant for today's consumers, increase ratings, and increase revenue.

Products such as chewing gum, band-aids, credit cards, broadcast television shows, music album launches, and pro sports need a robust, always-on consumer sharing feature inside their own product experience to improve the consumer experience and drive growth. This disclosed technology allows broadcasters to use a white-label consumer sharing experience dropped into programming through a vanity URL or other logical address displayed as a digital onscreen image ("broadcast bug") during a show. It provides the consumer audience with seamless content creation including compelling branded filters. Consumers then share across any and all third-party social and messaging platforms. Broadcasters have complete brand-safety and control with moderation capabilities. The broadcaster uses an interface to see all content the consumer audience creates in real-time and instantly moderates, curates, and allows spot media to be immediately created for use within the broadcast show, broadcast commercial, and/or streamed media.

FIG. 1 contains a concise overview and both dependent and reliant systems of the disclosed technology. It shows both systems of the technology and illustrates the data-flow making it possible to seamlessly integrate user-generated content into a plurality of broadcast media systems.

In some implementations of this disclosed technology, noted systems and interfaces may run on their own server. In some implementations, noted systems and interfaces may run on shared servers. In some implementations, noted systems and interfaces may run on one or more servers in distributed federated workload fashion or in parallel. In some implementations, noted systems and interfaces may run in "serverless" environments relying on $3^{rd}$ party services to implement their work. In some implementations, noted systems and interfaces may run in load-balanced, and/or multi-availability zone, and/or hot-standby, and/or servers or services in disparate multi-geographical regions.

The Consumer Device Interfaces (100) and Consumer Processing System (200) and Sharing Destinations (300) are also discussed in previous related patents and patent applications, U.S. Pat. Nos. 8,667,016, 8,935,611, 20150117839, and 20150294367 and 20170098255 noted above, all of which are incorporated by reference.

As a high-level simplified overview of a subset of the disclosed technology, user content is acquired in a white-labeled client nature (100), processed and enhanced with additional creative (200), shown to the user (100), approved by the user (100), passed into a system of checks and requirements of human and/or automated fashion (400) established by the broadcaster (600), manipulated for broadcaster use (500) based on pre-established governance (400 and 600), transmitted to the broadcaster (700) and then added to one or more consumption points (800, 810, 820, etc.).

As illustrated in FIG. 1, the systems and services labeled as 100, 200, 400, 500, and 600 comprise the disclosed technology. They exist in a network environment and may exist in one or more physical and/or cloud environments, or some combination thereof. The systems and services labeled 300, 700, and subsequently 800-820, are recipient services. These recipient services are also in a networked environment but respond and are communicated with in a variety of ways with a variety of required communication and media formats and protocols. Network connectivity between 500 and 700 can allow for a high transmission rate as transmitted media can be very large, however not providing this will only reduce the type or size of Spot Media transferable or delay its delivery. This may necessitate networks to be in close proximity to each other.

The data flow and signaling expressed in FIG. 1 only conveys some more significant processes and signaled events. Storage of media in all forms and stages is assumed. Access to that media within networks is governed by access control systems. Storage of metadata of consumers, user-generated-content, processing systems, and administrative systems is stored in machine operating system images, hard-disks, and/or database repositories. Access to these is provided by APIs and limited by access control systems. Any and all networks may be employed, such as LAN, WAN, VPC, VPN, wireless, mobile, etc.

Consumer device interfaces (100) are encompassed by a variety of mobile and non-mobile personal computing devices and interfaces. Most commonly these would be mobile phones capable of running apps and/or web browsers, recording audio and/or video, and providing a method for text entry. These may however be a wide range of devices including but not limited to tablets, laptops, desktop computers, console gaming devices, in-store kiosks, smart televisions, interactive displays, smart glasses, wear-ables, etc. These interfaces are arrived at via a wide variety of activation methods. These may include but are not limited to: email, shared or promoted social network posts from consumers or broadcasters, chat messaging systems ("chatbots"), online ads, incorporation in mobile apps, vanity URLs, QR codes, physical ads, packaging, persistent physical installations, and various forms of television programming.

The implementation of a Consumer Device Interface (100) may be a mobile website accessed standalone, through an HTML iframe, a mobile app webview, a native app library, a standalone app, a collection of APIs, etc. Within some implementations, the Consumer Device Interface (100) the consumer grants rights, agrees to terms of service, provides their birthdate for COPPA compliance, understands the type of UGC to provide, and is made to understand the context of that content. This may be accomplished with messaging, instructional videos, example brand ambassador videos, and/or other consumer content. This interface facilitates the easy transmission of UGC to the Consumer Processing System (200), indicated as 1A. In some implementations, the user may also supply multiple pieces of content such as a testimonial video, a selection of their favorite team in a league, and a title for their testimonial.

The Consumer Processing System (200) applies rules and allows for consumer direction of augmentation of the UGC. In some implementations this may receive branding. In the case of UGC video, this may involve cleaning and improving the user video, adding video to the beginning and end of the video, reducing noise on the submission, adding audio tracks and sound effects, applying extensive visual effects, repositioning, overlaying video, detecting elements in the content and reacting to them, adding text animations from the user, etc. Some or all of these may be varied based on business logic such as time of day, geo-location, social affinity, randomization, etc. Further, user controlled aspects, such as in the example of a sports team may be applied showing logos, stickers, color isolation of team colors, specific intro reels, the current score of game, and the addition of animated user text. The result of this is returned to the user in the device interface (100) for review as 2A.

After receiving the material for review from the Consumer Processing System (200) in step 2A, the Consumer Device Interface allows the user to resubmit content (1A) or to approve and save the augmented UGC (1B). After saving the user may optionally be prompted to provide contact information in some implementations.

After saving and/or supplying contact information if applicable, the user may be allowed to share their co-created content (10) to Sharing Destinations (300) on social networks, through email, SMS, chat messaging systems, or any system that accepts a URL, image, video, text string, or some combination.

In some further implementations, the user may also actively submit their UGC for a particular purpose, broadcast purpose, contest, etc. In yet other implementations that submission may be implied.

All augmented UGC may be subject to moderation, which may be automatic, proactive, and/or reactive. Videos remain within a walled garden and may be revoked until they are republished or delivered as Spot Media to Broadcaster Systems. For example, the present system may employ the moderation system described in US App. No. 20170098255 noted above.

Systems 100, 200, and 300 all interact with immediacy. They provide for the permissive and easy ingestion of UGC, application advanced augmented effects, user approval and allow for immediate user sharing. The UGC is then immediately made available to the control systems of the Broadcast Administrative System (400).

Still in FIG. 1, the shown Broadcast Administrative System (400) is the control center for all operations responsible for taking the UGC and preparing it for broadcast. This system receives immediate notification (2B) from the Consumer Processing System (200) that new UGC media is available. The system then may immediately, or once conditions are met, initiate (4B) the Broadcast Processing System (500) to prepare, construct and transfer (5C) or make available (7A) for transfer the Spot Media, based on UGC, ready for broadcast (700).

The Broadcast Administrative System (400) has a variety of high-level control systems. It has autonomous rules-based systems. It provides programmatic end-points for other dependent systems. It collects and processes analytical data. Many of its services are established or driven with input from Broadcaster Device Interfaces (600). The Broadcaster Device Interfaces (600) use APIs (4A and 6A) provided by the Broadcast Administrative System (400) to provide a website user interface for Broadcasters. The Broadcaster Device Interfaces (600) allow for the modification of some of the control systems of the Broadcast Administrative System (400). These systems and services are discussed in more detail below and outlined in FIG. 2.

The Broadcast Processing System (500) is a rules-based automation signaled (4B) by the Broadcast Administrative System (400). It feeds status information to surrounding systems (500 via 5A, 200 via 5B, 700 via 50). It follows rules established by the Broadcast Administrative System (400) to select which manufacturing media and content augmentations may be applied. These are then transmitted to (5C) or made ready for retrieval from (7A) the Broadcaster Media Systems (700) according to integration rules from the Broadcast Administrative System (400). These transmissions may be constrained by access control systems and may use encryption standards.

The Broadcaster Device Interfaces (600) manifest in one or more implementations for each Broadcaster. A common implementation is a general purpose website allowing access to all primary services provided by the Broadcast Administrative System (400). That website is itself accessible from a very large range of common computing devices, mobile and non-mobile.

A second example implementation (of 600) is a reduced selected set of the same services with a more customized user-interface to be provided to a Broadcaster or their designated party. This second example may be used for direct inclusion (via iFrame) in a Broadcaster or partner content management system or $3^{rd}$-party system.

A third example implementation (of 600) is a public API which allows developers employed or not employed by the Broadcaster to develop systems to manipulate the values, definitions, rules, and media content services of the Broadcast Administrative System (400).

Still in FIG. 1, the Broadcaster Media Systems (700) functionality and capability vary widely by Broadcaster and within Broadcaster organizations. Manufactured Spot Media and/or their metadata flow (5C) from the Broadcast Processing System (500). These may be pushed or pulled. The Broadcaster Media System (700) may be signaled (5C) by the Broadcast Processing System (500). In other implementations the Broadcaster Media System (700) may poll for status changes (7A). In some implementations the signal may be accompanied with metadata and/or Spot Media as a push into the Broadcaster Media System's (700) content management system via an API the Broadcaster Media System (700) provides. In other implementations the metadata may be pushed but may refer to Spot Media available at $3^{rd}$-party networked cloud storage vendors. The defined endpoints for push and/or pull systems, the protocol and scheme for addressing those endpoints, the locations of those endpoints, their request and response formats, and their access credentials are all variations on methods to deliver the Spot Media from the Broadcast Processing System (500) to the Broadcaster Media System (700) as soon as it is available. In some implementations where video and/or audio is the primary Spot Media format and imply a time sequential processing need, the final Spot Media may be streamed from the Broadcast Processing System (500) to the Broadcaster Media System (700) before later portions of the Spot Media file still being processed. In some implementations, such Spot Media may stream directly to the end-receiver (800, 810, 820, etc.).

Broadcast Television Shows (800), Broadcast Commercials (810), Media Streaming Platforms (820) are some example destinations for the highly augmented UGC Spot Media. These destinations may be live, delayed, pre-recorded, in-venue/on-location, in-studio, run by the Broadcaster, an affiliate, a production company or studio, a $3^{rd}$-party technology provider, some combination thereof, etc. Persons working at these destinations are considered Broadcasters and in some implementations have the ability to adjust the Spot Media manufacturing, method of transmission and integration, filtering and frequency, and/or other services of the Broadcast Administrative System (400) as accessed through the Broadcaster Device Interfaces (600).

Figure 2:
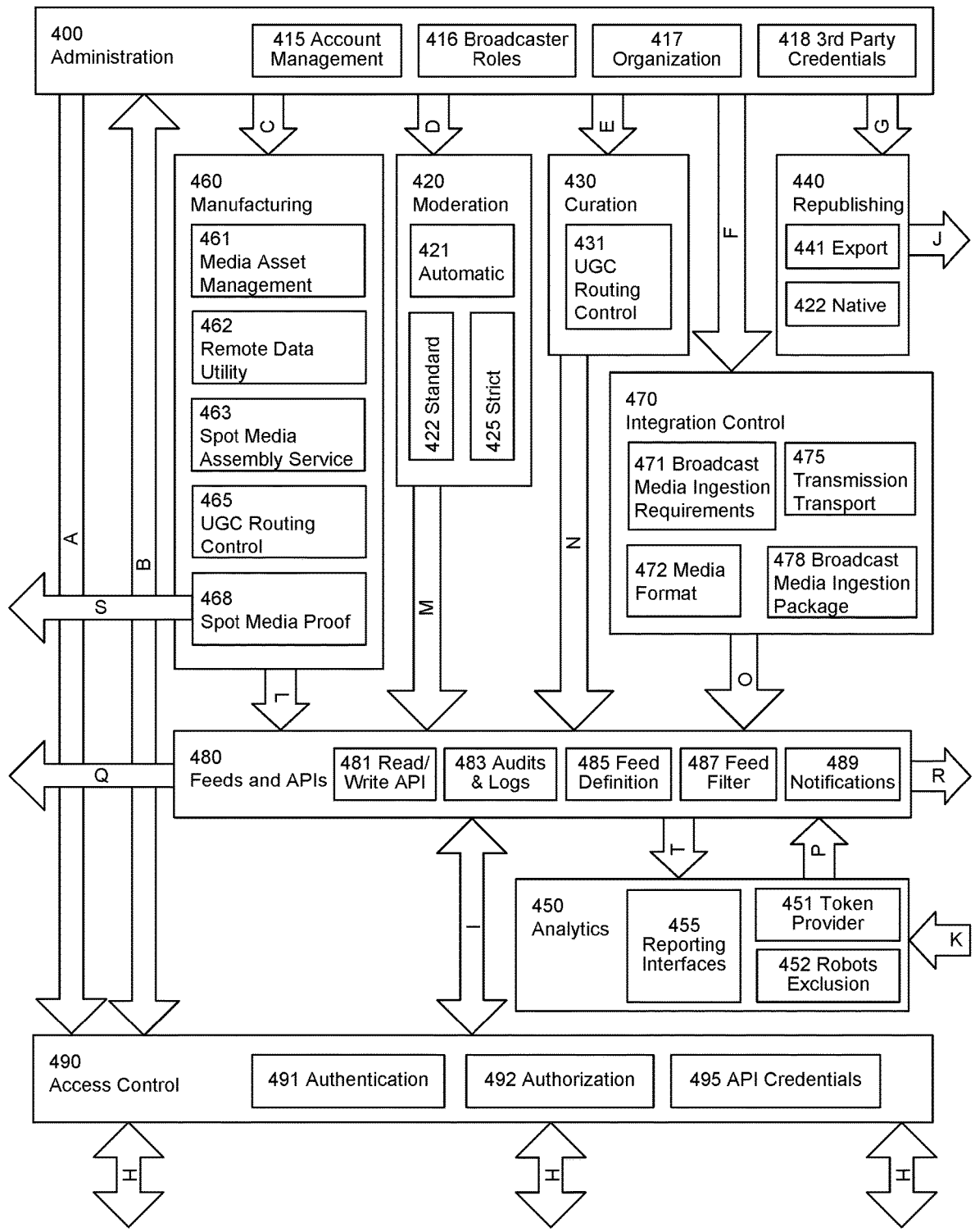
FIG. 2 is a block diagram illustrating detailed service components providing control elements to the disclosed technology.

FIG. 2 shows detailed subsystems of the Broadcast Administrative Service (400) which provide many represented control services for the manufacture of specific Spot Media.

In FIG. 2, the Administration subsystem (410) is shown providing services related to accounts and access permissions to other services of the Broadcast Administrative Service (400). It may provide for the storage, retrieval, modification and verification of users Account Management (415) of the services and all services within the system (400). Those Account Management (415) services may provide for Single Sign-on ("SSO") capabilities with $3^{rd}$-party directory services. Those Account Management (415) services in the case of non-SSO accounts can provide for the resetting of passwords and active confirmation of email.

In some implementations, the Administration subsystem (410) may allow for the provisioning and association of Broadcaster Roles (416) which could be simplified access privileges allowing for the ability to access, or access and manipulate specific subsystem services or in some cases specific capabilities within a subsystem service. For example, a user may have the ability to add, change, or delete rules and media assets in the Manufacturing subsystem (460) and Integration Control subsystem (470), but may not have the ability to Moderate (420), Curate (430), or Republish (440). Another example may allow the same user to view rules and media assets in the manufacturing system, but not change or delete them. Another example would be a user who has an administrator role, which can add, change, or delete users in the Administration (410) subsystem itself.

The Administration subsystem (410) also may provide for the ability of a Broadcaster to be associated with their Broadcast Organization (417), sub-organization, or multiple organizations and/or sub-organizations. Those organizational limitations can apply with precedence to all subsystem access limitations and permissions.

In additional implementations of the Administration (410) subsystem where Republishing (440) is required, the setting and updating of $3^{rd}$-party sign-on credentials and tokens (418) either at the Organization or individual Account Management level. In the case of these credentials (418), they would be tokens associated with social accounts such as Facebook, Twitter, YouTube, LinkedIn, Pinterest, etc.

The Administration subsystem (410) provides (Arrow A) the Access Control subsystem (490) with Authentication (491) and API Credentials (495) specific to a user or organization. The Administration subsystem works in conjunction (Arrow B) with the Access Control subsystem (490) to provide Authorization (492) permissions related its Roles (416) and Organization (417) access control lists. The Access Control (490) subsystem provides implementation of an interface (Arrow H) to the Broadcaster Device Interfaces (600) and acts as a gateway to Feeds and the API (480) (via arrow 'I').

The arrows 'C', 'D', 'E', 'F', and 'G' in FIG. 2 leading away from the Administration subsystem (410) to other subsystems illustrate the individual locking and permissiveness of Broadcaster Role (416) capability and not a specific implementation.

All account, role, organization, and credential information can be accessible by a subsystem if Access Control (490) permits the API (480) to obtain it. The API is the primary conduit for accepting and providing status information, signaling, control, and media to other systems and interfaces of the disclosed technology.

The Moderation subsystem (420) is a precursor to the Broadcast Processing System (500). While it is technically optional, it is important to most Broadcasters. It allows for the ability of Broadcasters, persons working on their behalf, to apply restrictions on submitted content based on a multitude of subjective criteria. In some implementations, submitted content can have a "flagged" status indicating if it is available for public viewing, appearance in Broadcaster galleries, available for Consumer sharing, available for Republishing, available for inclusion in some Feeds, or inclusion in processing for Broadcast consumption.

In some implementations, the moderation status may prevent any outbound processing of that content. A "flagged" status may be combined with a "reviewed" status, a "flagged category" and a "flagged annotation", or some method of combining this layered metadata. Additionally, a historical layering of these state changes and an associated "datetime" and "account name" may be useful for more complete understanding of why a particular Consumer submission is in a particular state. These techniques allow for content within the disclosed systems to have example combined moderation status like: "Dec. 4, 2017 9:15 am ET, John Jones reviewed this content and flagged it as 'Off-brand' with an annotation of 'showed competitor product'". Another combined example moderation status may be understandable as, "Dec. 4, 2017 9:30 am ET, Jane Smith reviewed this content and removed its flag noting, 'inconsequential'". Other example flagged categories may be "Inappropriate graphic content", "Harmful or objectionable content", "Spam", "Copyright violation", "Unapproved people in content", etc.

In some implementations, when content is moderated and flagged, it may enter an intermediate state. Content in that state may be reviewed and then may either be ignored, reinstated, or marked as deleted, and/or permanently deleted.

When a moderation status is changed the rest of the system is notified by communication with the API (via arrow M). This affects other moderation activities, the all downstream Feeds, and changes suitability of the content throughout manufacturing, all the way down to Spot Media within Broadcaster Media Systems (700).

Moderation of content may originate from the public. Where content is displayed socially, prior to any Broadcaster Processing, there may be an option by the public at large to flag that content for a set of reasons. These may be acted upon in a similar immediate manner or different suggestive manner than flagging operations that happen within the Broadcaster interfaces.

After the Consumer approves content (FIG. 1, arrow 1B) they may share that content immediately (FIG. 1, arrow 1C). That content may only be a URL reference to the content instead of the content media itself. When content first arrives in the Broadcast Administrative System (400, via 2B) its moderation status can be "un-reviewed and un-moderated".

Automatic (421 in FIG. 2) moderation may be applied to different forms of content in appropriately different ways. It is important to note that some forms of automatic moderation may be possible to perform immediately after receipt of that content, while other content may require processing. The Automatic (421) moderation service can allow for the Broadcaster to enable different forms of automatic moderation and establish thresholds for those operations. For instance a Broadcaster for one television show may enable automatic flagging of nudity, bikinis, and swearing and set a low certainty threshold so content is aggressively flagged. Conversely, the same or different Broadcaster may make very different selections for a different show or program. Some automatic flagging may require more delay for different content and acceptable options may be available. For instance automatic flagging of video content for nudity may allow for "fast evaluation" vs. a "complete evaluation" where every video frame is independently evaluated. As pattern matching neural networks receive more training sets for flagging reasons, automatic flagging of text, spoken language, photos, and video becomes easier.

All Automatic (421) evaluations for flagging can result in some form of update to the moderation status. If the content has already been "reviewed" by a Broadcaster then the moderation status update may not change the moderation status itself, but only comment on it. All automatic moderation can record values of the result of the evaluation and may express them with one or more decimal certainty ratings from 0 to 1. These values may then be reapplied to content if the Broadcaster re-establishes the thresholds used to flag or not flag content.

Because the Consumer may only share a URL reference to their augmented content (FIG. 1, arrow 1C), that content may be changed and/or access to that content may be changed, both as a result of moderation. Standard Moderation (422 in FIG. 2) is a reactive model of moderation where the augmented content is publicly available and assumed to be acceptable until it is flagged. If it is flagged, the underlying content and its sharing metadata may be immediately changed and the social networks and assisted sharing applications may be contacted and instructed to update their understanding of the shared content. In an example case, a consumer shares their augmented video commercial of their child eating macaroni and cheese. The Broadcast partner responsible for the manufacturing of commercials flags the video because they notice it is a competitor's macaroni, which they do not want their brand associated with. As a result, the content is immediately unavailable for playback and the locations the video was shared with are updated to learn that the content is no longer available. This may manifest in the updating of social post content, previews, or the entire posts themselves.

An inverted form of broadcaster's Standard Moderation (422) is broadcaster's Strict Moderation (425). Strict Moderation may exist as a proactive model where moderation must be performed before the content media can progress within the Broadcast Processing System (500) if a feed filter requires a verified moderation status. Further with Strict Moderation, when a Consumer shares the augmented content they previewed, the shared content is placeholder content of a similar form but generic in nature. That content may be something that indicates the Consumer's content is being approved before it is available. Once that content has been reviewed it is either flagged for a reason or made available to the public. When it is made available to the public, the placeholder content and metadata can be replaced with the real Consumer's augmented content and social networks may be instructed to update their display choices to show the Consumer's content instead of the placeholder content. Further, passing a Strict Moderation check removes a common obstacle, and may allow for the content to progress through the system to become Spot Media.

It can be noted that in the case of Strict Moderation (425), Notifications (489) are an important item to implement such that Broadcasters or their delegates can be informed about content requiring moderation and that such moderation can be provided in a timely manner.

The Curation subsystem (430 in FIG. 2) is a method of review and categorization. The Broadcaster Device Interface (600 in FIG. 1) may allow for the providing a star rating, numerical rating, favorite, voting, sticky-pins, and/or tagging with meaningful words and short phrases. Broadcasters, their delegates, or automations may perform these operations. The result of adding these attributes to the metadata of submitted content allows for filtering of that content in Feeds, providing a search interface, and may be criteria which may be immediately relayed by API (arrow N) and operated on by the Broadcast Processing System (500 in FIG. 1) by way of the Feeds and APIs (480 and arrow Q). These attributes may be available to implementations of public displays of the content in isolation or in collections or galleries. As an example, setting a numerical rating of 98 on content may mean that it meets the bar for inclusion in Spot Media manufacturing, or it may mean that it is only eligible if certain other requirements are met. Tagging may be something that is kept internal to a Broadcaster's organization and flows into the Broadcaster Media System, or it may be intended for external use, or in other implementations, there may be internal and external tags. An example of sticky-pin use would be for a particular submission to be kept at the top of various gallery listings as an example form of UGC to other UGC creators.

Voting and favoriting may be something that is performed within an audience of Broadcasters within a Broadcaster organization. Or voting and/or favoriting may be a system, which is available in some contest contexts where permitted Consumer content is presented for public or semi-public review. Vote counts or favorite counts may be used as a method of progressing Consumer UGC to Spot Media.

The Republishing subsystem (440 in FIG. 2) is an example of a subsystem which can be easily added to the Broadcast Administrative System (400) which provides simple beneficial media download and media re-posting capabilities.

The Republishing subsystem (440) can allow for the easy Exporting (441) and simple transformation of both original Consumer content, augmented content, and any augmented derivatives. These may all be requested together or individually. There may be a browser allowing the Broadcaster to select the specific media assets they desire. These assets that already exist can be available for immediate export. If an asset does not exist in the form requested then it may be generated on-demand and returned in-line with the request or the Broadcaster may be informed that they will be notified when it is available. Transformations may be to upscale or downscale quality, color, size, format, etc.

The Republishing subsystem's Native republishing (422) component uses supplied $3^{rd}$ Party Credentials (418) and can use known file formats and published APIs for republishing destinations. In some implementations, files sent to republishing destinations are created on-demand. In other implementations, they are created in advance in all cases. Native republishing is a simple feature but it does cause the media to leave the confines of the system (arrow J) such that normal, previously discussed, flagging and deleting operations would require additional tracking and implementations to achieve. An example of Native Republishing (422) is a Broadcaster decides to give a preview of an up-coming show where they will air a Consumer submission as Spot Media. The Broadcaster selects the Consumer submission in the Broadcaster Device Interface (600) and opts to republish to Twitter. They form a Tweet message and submit. An augmented video of the Consumer UGC is built and included natively in the tweet. They may also elect to publish the entire Spot Media or opt to edit for length in the interface.

Exporting (441) and Native Republishing (422) can be something directly associated with the content within the Broadcaster Device Interface (600) and may be combined in the user interface with Moderation (420) and Curation (430) activities.

The Analytics subsystem (450 in FIG. 2) is a useful subsystem of the Broadcast Administrative System (400) and provide metrics which may act as criteria for Consumer content to progress toward becoming Spot Media. Metrics are acquired from interactions with the augmented UGC. Example metrics are: impressions, views, video starts, video completes, video percentage-viewed statistics, interactions with calls-to-action associated with the augmented UGC, shares, re-shares, likes, favorites, votes, quotes, comments, replies, mentions, social profile metrics, interactions in specific sharing platforms, interactions from certain geo-locations, etc. Example requirements for using metrics to progress UGC to Spot Media may be a certain number of views, a high ratio of engagement with calls to action, a contest for the most number of likes or comments, etc.

When metrics are to be provided, clients supplying them (arrow K) can acquire a unique analytics token (451). Behind the scenes, a derivative analytics token may also be acquired. This token can be arrived at using a "fingerprint" of client information available to the server providing the analytics token. This token can be associated with all atomic metric data.

The Analytics subsystem (450) can have multiple layers of insuring confidence behind the values of the metrics collected. Robots can be excluded (452). Known robots can be excluded from analytics endpoints using robots.txt. Formation of the unique analytics token can use at least one client-side executed computation such as Javascript. User-agents known to be robots or self-identified as robots can pass through all the normal steps but may not have data permanently recorded with analytics. Limits can be placed on increases of metered values that are deemed not likely to be from humans consuming, viewing, watching, or interacting with the content being metered. This can be done through analytics processing using the analytics token provided and analytics token derivative, where violation of those limits can silently remove those values from metrics inclusion. This analytics processing may be done in parallel or as a prerequisite to the values being further committed to the system. Because evaluation of metrics is a criteria that may be used for the creation of Spot Media and because Spot Media may be needed with some immediacy, any analytical processing can be fast and if operated in batch mode with frequent operation. Further, it can be a best practice for incrementing values to never be adjusted down once realized for it would be erroneous on Broadcaster Reporting interfaces (455) and also because metrics may be a factor for releasing Consumer UGC for processing into Spot Media.

Recorded data may be written to a SQL database, NoSQL database, Time Series Database or any other reportable persistent store, or multiple database systems based on the needs presented in the Reporting Interfaces (455). This can be done via (arrow P of FIG. 2) internal API (481) writing to such a storage and query system.

The Analytics system (450) may have a variety of useful dedicated reporting interfaces and/or have analytical data integrated with other user interfaces. These would all be exposed to the Broadcaster Devices Interfaces (600 of FIG. 1) and accessed through query APIs (481 via arrows H, I, and T, of FIG. 2).

An example Reporting Interface (455) reports may be centered on the Consumer submissions, where they were submitted from, when they were submitted, their curated quality, their flagged status, attributes about the submissions (runtime length of audio, photo orientation, aspect ratio, augmentation applied, etc.), popularity of the submissions (views, plays, likes, favorites, comments, etc.), the language of the submission, demographics about the Consumer (age bracket, gender or gender affinity, etc.), where the submissions were shared to, if the Consumer wished to have their submission viewed publicly, if the Consumer opted to submit their content for a contest, etc. A different example Reporting Interface (455) may be concerning the key performance indicators ("KPIs") about the overall trend of activations, submissions, views, impressions, click-through rates on varied calls-to-action, exposure, etc. compared with their expected goals with time as a trending factor. Another example Reporting Interface example is a "leaderboard" showing what submissions have the most views. Another Reporting Interface is a dashboard showing high-level metrics and their current values for a Broadcaster. Another Reporting Interface example is a tabular report where selection data can be filtered, columns chosen, and data reported and then exported as a comma separated values (".csv") file. Another example interface is exposing data associated with individual Consumer content and displaying it in the Broadcaster's Moderation and/or Curation user experiences (e.g.—views, likes, views per country, time trend of views, etc.). Another Reporting Interface example is one used to integrate with $3^{rd}$-party analytics companies. Such an interface may be exposing the most atomic data stored, or it may be exposing only key metrics at a summary level.

The Manufacturing subsystem (460 in FIG. 2) is a service that allows Broadcasters to define how Consumer content is turned into Spot Media and what that Spot Media looks and/or sounds like. The Manufacturing subsystem (460) has four components; Media Asset Management (461), Remote Data Utility (462), the Spot Media Assembly Service (463), UGC Routing Control (465), and the Spot Media Proof (468). Like many other systems it can make use of Broadcaster Roles (416), to limit which Broadcasters can view and/or manipulate Manufacturing directives and assets. Also like many other subsystems, the Manufacturing subsystem may use the Read/Write API service to as a gateway to a persistent data store (arrow L), as a means of saving and retrieving these Manufacturing directives and assets.

The Media Asset Management (461 in FIG. 2) component is a service which can be used to allow Broadcasters to browse, search, import, select, preview, inspect, download, modify, name, annotate, categorize, tag, delete, etc. raw standalone files. These files are files that are used within the Spot Manufacturing in the Broadcast Processing System (500 in FIG. 1).

Managed media assets may be in a wide variety of file formats. At their heart, they can be video files, audio files, image files, 3D model files, and visual effects description files, etc. These files may have special designated purposes or classifications. Many media assets are optional and not required for the production of Spot Media.

Some examples of possible video asset classifications managed by the Media Asset Management (461) component are: intro videos, outro videos, video overlays, video underlays for green screens, video textures and cosmetics, video elements to be used with point-parameters and/or auto-detection of points (points on a face, points on a body, points in a scene), and call to action videos. All of these assets may vary by product, brand, television show, movie, segment within a television show, or episode. Some examples of visual effects description file classifications are: output formats from Adobe Premiere, Final Cut Pro, Sony Vegas, etc. and may use extension libraries like Sapphire. These files contain timing information along with hundreds of parameters used with specific visual effects. Effects may reposition and/or scale a consumer video, add a lens flare, color shift, warp pixels within a region, apply a transition, apply a "beauty" filter, track and manipulate an image or text with the video, speed or slow, sound effects, etc. Some examples of image purposes are: overlay images, social sharing images, promotional images, image textures, video padding images, logos, end cards, call to action images, animated images, sticker images, stock photos, "meme" images, display background images, icons, etc. Some examples of audio file classifications are: intro audios, outro audios, full audio track, consumer audio track mix, transition sounds, songs, etc. Some examples of 3D model asset classifications are: masks, clothing, actors or characters, objects, all rigged, animated, or still.

In addition to asset classifications based on their purpose, assets may have sub-classifications based on their suitability. For instance, an "intro video file" may be a 15 second clip intended for appending to a consumer video segment. As an example, it may however have a sub-classification format that indicates it is a "Scope Cinematic 4K" with an aspect ratio of 2.35:1. Attempting to conduct Spot Media Assembly (463), discussed below, across different sub-classifications of a single format would not have good results, so sub-classifications and/or formats can be easily recognizable and filterable within interfaces to the Media Asset Management (461) subsystem.

The Remote Data Utility (462 in FIG. 2) is an optional but very useful server-based component that may be configured to request primarily, but not exclusively, textual information from $3^{rd}$ party systems. This information is then possible to be integrated into the Spot Media within the Spot Manufacturing phase of Broadcast Processing (500). This utility service defines simple "call-out" resources for this data. As an example, a $3^{rd}$ party service may provide the current score of a game and that could be added as a text overlay or crawler along the bottom of a sports fan video. Additionally, information concerning the consumer may also be applied to the inquiry performed by the Remote Data Utility. For instance, it may include the approximate gen-location or demographic information. This could return more specifically data based on this information such as values for weather metrics or images, election results, World Cup team scores, team captain imagery, or even audio of horns proudly blaring or sadly mourning, etc. The purpose of this data is for it to be easily incorporated in the manufactured Spot Media. The utility is similar but may be a more simplistic version of the Transmission Transport component (475), discussed below, in that this utility may put demands more protocol and response format demands on the remote systems returning query data. The utility may allow for entry of an arbitrary SSL URL denoting the $3^{rd}$ party service, an authentication token used in an HTTP header and a few options on how to decode and make use of the result. For instance, the response result may be in format text/plain, image/jpg, or text/json with a limited and well-defined expected format of that JSON response. The utility can also be able to gracefully handle errors and unavailability of the defined $3^{rd}$ party systems. This is noted in the control component because the Broadcaster may wish for default text or imagery to appear if the $3^{rd}$ party system does not return a useful result.

The Spot Media Assembly service (463 in FIG. 2) defines the media and special effects that are to be used in the manufacturing of Spot Media. It can be leveraged in the Broadcaster Device Interfaces (600 in FIG. 1) as a tool with a variety of visual, possibly drag and drop mechanisms for different desired forms of Spot Media. Selection of media can leverage the Media Asset Management (461) component. The service allows for the definition of for one or more media assets to be combined with the Consumer content, and optionally content from the Remote Data Utility (462) to define a template for what Spot Media will be produced. If the Spot Media has a temporal component (e.g.—audio, video, animated visual effects, etc.) then the assembly service and its corresponding user-interface will present an ordered visual for such assembly. For instance, if the Spot Media is a video commercial segment the user-interface to the assembly service may present area for selecting an "intro video", the Consumer video, a transition, an "overlay video" and a "special visual effects definition" and a "special audio effects definition" for the Consumer video, another transition, an "outro video", and a secondary audio track mix. A template for the Spot Media Assembly Service (463) may also allow for inclusion of Remote Data for game scores, donations received for disaster relief, number of album sales, YouTube plays, etc.

The Spot Media Assembly service (463) may commonly receive slightly different forms of Consumer content for a singly defined Spot Media. For instance, someone may supply a 360 degree video when the rest of the assembly (e.g. "intro video") assets are flat 1080p landscape videos. Or the supplied Consumer content may have a run-time that is too long. Or the supplied Consumer content may be a panorama photo when a square photo is expected. Or the supplied Consumer content may be shot in portrait instead of landscape, etc. In response to this, the Spot Media Assembly service may consist of sets of assembled manufacturing directives that result in the same Spot Media goal, and may be the same format or may be different.

For instance, a given Spot Media may be for a television commercial about health food. The defined assembly instructions may expect a landscape Consumer video. A second assembled media asset may be defined for portrait for the same Spot Media. The Broadcast Processing System's (500 in FIG. 1) Routing Processor (510 in FIG. 3 discussed below) will make use of the defined assembly instructions which adhere to Access Control measures of the read/write API, match the desired Spot Media, and meet the needs of the manufacturing instructions of the Spot Media Assembly Service (463). In the example health food commercial example, if a Consumer supplies a portrait video the resulting Spot Media may show that user video repositioned to the right of the video frame with nutritional information facts displayed on the left side of the screen. If the Consumer supplied a landscape video, the media assembly assets may result in a similar Spot Media but with a full user video with the facts animated over the video. Similarly if the Consumer video was of a low bitrate there may be one or more defined assemblies which position and scale the user video to occupy less of the final Spot Media to preserve the apparent quality of the end product.

In cases where the Consumer content is in complete disagreement with the defined assembly (e.g.—audio is supplied instead of a photo) there was a problem, misconfiguration, or inappropriate use of the Consumer Device Interfaces (100 in FIG. 1). Those forms of Consumer content can be rejected and flagged as incorrect content by the Broadcast Processing System (500) and exposed to Broadcasters through Moderation and Curation services.

In cases where the Consumer content is subtly different, that content may be automatically adjusted within the Broadcast Processing System's (500) Content Normalization component (discussed below). By way of example, the content may be truncated, volume normalized, pixel density adjusted, cropped, brightness adjusted, etc.

In addition to a single form of resulting Spot Media, additional forms may be created. The assembly of these may be defined within the Spot Media Assembly Service (463), but the direction to manufacture different Spot Media files can be driven by the UGC Routing Control component (465).

Like most Broadcast Administrative System services, Spot Media Assembly Service (463) may provide auditable change logs and versioning with the ability to revert to earlier versions. The Spot Media Assembly system can provide the ability to preview and test without affecting the currently used assemblies and manufacturing. When an assembly is ready to be used it may be released immediately or it may be released at a planned date and time in the future without human involvement.

The basic service that the UGC Routing Control (465) component allows Broadcasters, via a user-interface (600), to specify an input channel of Consumer creative defined as a Feed Filter (487) and designate one or more Spot Media Assembly (463) directives with that Feed Filter. They may also specify or imply logic expressions and conditions for the successful application. For instance, they may require at least one of the Spot Media Assembly directives work with the Consumer submission. Or they may require all of the Assembly directives work with the Consumer submission. Or they may require that a subset of Spot Media Assembly directives work and others may work. Using the above health food television commercial example, a Broadcaster could indicate a source of Consumer video submissions and associate them with two Spot Media Assembly directives; one for landscape Consumer videos and one for portrait Consumer videos. The Broadcaster could also indicate two other assemblies that take a landscape or portrait video, respectively, and produce a poster image from the video. The logic expression could indicate one of the first two assemblies must succeed and one of the two secondary assemblies must succeed. Otherwise the Spot Media manufacture may not be considered successful.

The advanced service that the UGC Routing Control (465) component may provide Broadcasters, via a user-interface (600), is to allow them restrict or require conditions, typically of the Consumer request environment, and have those conditions change which Spot Media Assembly directives are used.

Example advanced conditions which may be used in the UGC Routing Control (465) component are: mapping a Consumer to the closest geographically defined Spot Media Assembly, "geo-fencing" a Spot Media Assembly by requiring the Consumer submitted their content from within that bounded location (such as a sporting event, musical concert, parade, city, country, etc.), geo-fencing multiple locations (such as hundreds of movie theaters affiliated with a company, all donut shops for a major brand), local time of day of the Consumer (such that a restaurant chain may have assemblies that result in Spot Media featuring breakfast, lunch, or dinner media broadcast assets), social affinities (using known "Likes" and "Favorites" to influence employed assemblies), known social followers (using known "Follower" or "Friend", etc. relationships to influence employed assemblies), the manner or place or context or preceding context that the Consumer activated the Consumer Device Interface (100 in FIG. 1) (such as a fan forum in Reddit, a Facebook Page but only if it is on a mobile device, in Twitter but only if it is on an iPhone, etc.), demographic information supplied by the user or arrived at via context or $3^{rd}$ party associations (such as gender, age, nationality, spoken language, income level, etc.), active elections by the Consumer to influence which variation of Spot Media they appear in (such as giving a testimonial to vote for one of three vocalists, choosing your team in a matchup, supporting a listed charity, speaking about one facet of a cause, etc.), and/or a random element influencing the use of a different assembly or working as a random decision within an already defined condition.

The Spot Media Proof (468) service may allow a user-interface (600) to produce example prototype Spot Media on-demand (kicked off via arrow S in FIG. 2) and have it flow through the entire Broadcast Processing System (500 of FIG. 1) and into the Broadcaster Media System (700 of FIG. 1) with a specified tag indicating it is for testing of Manufacturing and Integration. The proof system may use demonstration content not from actual Consumers, but from a selection of one or more test Feeds. Or specific content may be uploaded directly. The Spot Media Proof component forces a specific Spot Media Assembly to be used with specific "demo" consumer content.

The Integration Control subsystem (470 of FIG. 2) is responsible for providing the instructions, methods, destinations, security measures, file formats, communication protocols and formats, and expected delivery packages to the Broadcast Processing System (500 of FIG. 1). Its instructions are accessible via the Read/Write API (481) component (via arrow O).

While the previously described Spot Media Assembly Service (463) and UGC Routing Control (465) both adapt or restrict themselves based on the incoming Consumer content form, the Broadcast Media Ingestion Requirements component (471) define the required product format of the Spot Media that results from that described manufacturing process. Some elements like portrait or landscape photos or videos may likely be encompassed in the directives established as part of the main Manufacturing process. However Broadcasters have much more fine-grained requirements for seamless integration into their programming. These are defined and grouped into requirements that are associated with the particular programming destination. Broadcast Media Ingestion Requirements (471) may established as some of the following example criteria: frames per second (FPS), frame count, microsecond duration, aspect ratio, pixel density, keyframe method, keyframe rate, audio codec, audio bitrate, video compression standard, video container, average video bitrate, image raster format, vector format, stereo format, 3D model, image compression, audio compression, etc. These requirements may be used at the tail-end of the Manufacturing process, or with optimizations starting near the beginning and continuing throughout to reduce transformations and increase both quality and possibly speed.

The above Broadcast Media Ingestion Requirements (471) may be referenced in a simplified form through a Media Format (472). This is a non-isolated named grouping of the requirements and can be used by the Broadcaster to easily understand and denote their programming needs. The abstraction of the detailed requirements and the simplified form is important for few reasons. One small group of Broadcasters may be allowed to modify the detailed requirements (e.g.—changing b-frames rates) while another group works with it at the logical level without the detail. Further, Spot Media when delivered to the Broadcaster, will be in a Media Format and that format may not need to be re-defined everywhere if a specific detail is changed. Many differently assembled forms of Spot Media will exist with creative asset differences targeted at different commercials, shows, movies, etc. However many forms of Spot Media will exist, many will share the same Media Format.

The following are entirely example names of Media Formats that could be used and/or created by a Broadcaster for their specific needs: Quick Mobile 480p clip, HD 720p clip, Padded Full HD 1080p 30.0 Spot, WUXGA No Limit, 2K No Limit, UHD No Limit, Flat Cinematic 4K (1.85:1) No Limit Original Programming, Scope Cinematic 4K (2.35:1) No Limit Smith Studio Integration, 8K No Limit Full Re-Edit, etc.

The Transmission Transport (475 of FIG. 2) control service is used to define the methods employed by the Broadcaster Processing System (500 of FIG. 1) of moving files to the Broadcaster Media Systems (700 of FIG. 1). These directives may be established, tested, and then only rarely changed or added to when new destinations occur (e.g.—new studios, new subdivisions, destination system changes etc.).

The Transmission Transport service (475) can allow for the entry of specific security credentials, API keys, and login information for destination Broadcaster Media Systems (700). If applicable the control service may allow for the method of renewing keys, if those specified keys may require renewal due to loss, system reset, inactivity, limited duration, etc.

The Transmission Transport service (475) may allow for the designation of a "pull" method control description, which may indicate the method of notifying the Broadcaster Media System that Spot Media is available. Such a method may include a URL endpoint to message to with a template payload message with substitution values including URLs to the specific Spot Media files. The URL scheme protocol may be HTTP, HTTPS, FTP, SFTP, etc. The notification may include metadata about the Spot Media. The overall and individual pieces of metadata about the Spot Media and the Consumer may be selectable (toggle on/off) within the Transmission Transport control service.

The Transmission Transport service (475) may allow for the designation of a "push" method control description with or without a notification method. In the "push" model instance, files would be pushed into a 3rd party destination system, that may or may not be a Broadcaster system, and then a notification may be made to another Broadcaster system alerting them to the fact that the push occurred and was successful. That notification endpoint would be established and a simple protocol for the message would be established. Such a push method would include a destination endpoint. If the endpoint is a repository with naming and organization qualities (such as provided by FTP, SFTP, or 3rd party file hosting services), the transport control may also allow for the designation of a directory naming scheme, and a file naming scheme. The control system may also provide for the ability to retry, limit the number of simultaneous connections, rate limit data uploads, or take other measures not to overtax the destination system(s). SFTP and FTP uploads may make use of parallel uploads. HTTP, and HTTPS scheme-based uploads may make use of multi-part uploads, partial size uploads, chunked encodings, etc. Metadata about the uploaded Spot Media may be in the notification, in the Spot Media itself, in query parameters of the upload, in the request header of the upload, in a multi-part text section of the upload, or in a pre-defined payload (text/plain name values, text/xml, text/json, etc.) of the notification. The overall and individual pieces of metadata about the Spot Media and the Consumer may be selectable (toggle on/off) within the Transmission Transport control service.

In some implementations, the Transmission Transport service (475) may allow for some "pull" transmissions to be established as "streaming endpoints". This may be ideal when the Spot Media is audio or video, when immediacy is desired, and/or the Spot Media file is large and/or with a significant runtime. It enables the Broadcaster Media Systems (700) to begin ingesting the Spot Media before the Spot Media is fully created. This may save time required in live broadcasts.

The Broadcast Media Ingestion Package (478) is an optional feature, which may provide for operations on the Spot Media or as additional scriptable operations to occur before and/or after the transmission of Spot Media to the destination systems. Examples may be to apply a non-standard wrapper to Spot Media (e.g.—.tar, .zip, .gz, .jar, .ar, .shar, etc.) request activation of a system or firewall, alert secondary HTTPS services, send email, etc. These scriptable "pre" and "post" file transport operations can occur within an isolated Broadcast Processing System (500). The system may instead provide only a list of allowed extra package operations with templates for filling in Broadcaster details (e.g.—archive compression to use, URL to request against, email address to notify, etc.). Establishment of these scriptable operations can be highly regulated and only permitted to Broadcasters with an administrator role privilege.

The Feeds and APIs subsystem (480) has a mix of internal components, which provide plumbing and conduits for other local subsystems, local systems (arrow Q) and external systems and services (arrow I). Unlike many other components in the Broadcast Administrative System (400), two of its components are not control services modifiable by Broadcaster direction via user-interface (600). These components which may not be directly modifiable are the Read/Write API component (481), the Audits & Logs component (483), and the Feed Filter (487). The Feed Definition (485) and Notifications component (489) may receive and may need direction from the Broadcaster.

The Read/Write API (481) may be used as the main access method to persistent data stores for all stored instruction data, creative data, reference locations, query analytics, etc. It can have access restrictions provided by the Access Control system (via arrow I) for internal and external access methods. Most get and set operations can occur through the Read/Write API. External access requests will come via the Access Center (490) directly (via arrow H). A good example API would be "RESTful", running over HTTPS, expressing itself in a consistent hierarchal URI format with limited use of query parameters, accepting all common HTTP methods, and returning a consistent JSON response with a consistent status header within the returned payload body.

The Audits and Logs service (483) may record and may provide details about changes to any change to any object (system, media asset, control directive, Broadcaster activity (moderation, curation, republishing, login, etc.), account change, autonomous activity, etc. Access to auditing information and logs can be restricted to those with administrative roles. Auditing and logging may not be modifiable. The precise time and date and account performing the action can be recorded.

The Feed Definition component (485) is a service which, via one or more Broadcaster Device Interfaces (600) user-interfaces, allows for Consumer content to be organized and fed into different services which can then be operated on automatically or reviewed by Broadcasters (or their delegates) or some combination thereof. Some feed definitions may be automatic and supplied as default to Broadcasters. Moderation (420) channels may consume feeds. Website galleries and creator galleries within Consumer Device Interfaces (100) may use feeds for determining which content to show. Broadcaster Device Interfaces (600) may use feeds to show Consumer content and/or specifically named segments of Consumer content. The Analytics subsystem and its Reporting Interfaces (455) may be able to use feeds to segment the presented reports.

If a Broadcaster wishes to have specialized workflows for moderation, curation, or republishing, they may define different feeds (485) to meet those needs. For instance they may wish to have one group of persons or agency review all content across an entire broadcaster network and include all shows, programs, and commercial spots. They may wish to have another group or agency review Consumer content received that is used in contests. They may wish for all Consumer content submitted from a country be reviewed by affiliates within that country. They may wish for curation to only occur for some types of Consumer submissions and to exclude those not in those submissions from those Broadcasters performing curation activities. Each of these examples may be one or more feeds that are made accessible to specific Broadcasters or groups of Broadcasters.

Attributes in a Feed Definition (485) would be set by a simple user-interface (provided by 600). Example attributes are: UGC SUBMITTED FOR TV SHOW (intro credits, segment, etc), UGC SUBMITTED FOR COMMERCIAL SPOT, AUTOMATIC MODERATION RESULT, MODERATOR REVIEW RESULT, CURATION RATING, GEOGRAPHIC ORIGIN, MINIMUM VIEW COUNT, MINIMUM FAVORITE COUNT, LIKES, COMMENTS, CTA CTR HIGHER THAN, ASPECT RATIO, ORIENTATION, MINIMUM SOURCE QUALITY, MINIMUM FINAL QUALITY, DATE RANGE, TIME OF DAY RANGE, DAY OF WEEK RANGE, SHARED TO FACEBOOK, SHARED TO TWITTER, SHARED TO (other social networks), SHARED VIA SMS, SHARED VIA EMAIL, COPIED URL FOR SHARING, NOT SHARED TO FACEBOOK, NOT SHARED TO (etc), CONTACT INFO IS AVAILABLE, WHITELISTED CONSUMER, MEDIA ASSEMBLY, MEDIA ASSEMBLY SET, RUNTIME, CONSUMER GENDER, CONSUMER AGE BRACKET, PINNED STATUS, CONSUMER ACTIVATION METHOD, CONSUMER DEVICE TYPE, etc. Attributes may be combined in sets or groups with logic "and" and "or" operators. Feeds may be defined with sort orders ascending or descending using any sortable attribute as a value. Sorts can allow for multiple sort hierarchy. Allowing content to be "pinned" to the top of a gallery in a Device Interface (100 or 600) may be accomplished with a multi-tiered sort order with PINNED STATUS==True as the first sort option.

The Feed Definition (485) component is the control mechanism for the Feed Filter (487). The combination of the two is responsible for the forward progress of Consumer content being processed into Spot Media, or conversely it is the final gate and requirement check before specific instances of Spot Media are created. As an example, a Broadcaster may require that all Consumer content for a particular show must not be flagged for moderation, have a five star curation rating, already have a minimum of 10,000 views, originate from Brazil, be actively submitted for a stated contest, and have been created within the last week.

Feeds may also be defined (485) for specific use of 3rd party applications accessing the Feed Filter (487) via remote 3rd party API. This could be for a wide range of purposes unlike extrapolations of the examples above.

The Feed Filter (487) is a specific implementation of the Read/Write API (481) for returning information on sets of Consumer content. It may be accessed directly or it may be accessed via the Read/Write API. The Feed Filter is read-only and may have many optimizations using caching strategies and pre-materialized partial results because of its filter nature and potentially large data set. The Feed Filter applies the Feed Definition (485) rules against the full set of Consumer content accessible to the particular Broadcaster, automation, and/or API call. The resulting set may be the same or reduced.

To allow for easier programmatic use and to lessen the transmission and processing burden, the Feed Filter may wish to allow for additional "on-demand" defined filter criteria such as "last-modified", time and date ranges, sort options, etc. Result pagination may also be a useful addition including the specification of "start at" and "limit" query operations. Additionally, compression operations may be a feature to toggle on in programmatic circumstances.

The Notifications component (489 in FIG. 2) has both a control function and processing system. The processing system may be independent and operate in a separate environment. The control function may allow a Broadcaster to specify a Feed and specify the issuance of a notification once a time interval (e.g.—minute, two minutes, five minutes, 15 mins, 30 mins, hour, day, week, month, etc.) when either new Consumer content is added to and appears in the feed, or when any Consumer content is present within the designated feed. The Notification is sent outside the system (via arrow R) to the receiving service (e.g.—mail server, SMS interface, etc.).

The Notification (489) may be an email, SMS, device notification in mobile app contexts, or instant message in messaging platforms. The destination for the message may be rigidly defined by the Broadcaster as any applicable identifier or group of identifiers (e.g. email address(es), phone number(s), device identifier(s), messaging identifiers, etc.).

In other implementations, the Notification (489) destination may be flexibly defined as the Consumer contact information the Consumer explicitly or implicitly supplied and only apply to the content of that Consumer.

In cases where the Notification (489) system is reporting to a Broadcaster or their designee, the data reported can concern one piece of Content or aggregate information about all Content in a feed. For example, based on a Feed valid for the hours 9 am-5 pm UTC, it may send the following SMS once an hour to persons responsible for curating content "Attention: there are 39 new Atlantic Talent Show submissions which have not been curated, Tap here to see them." An email, SMS, or app notification template may allow Broadcasters to establish the message of the SMS, email, etc. and supply macro/variable names that are substituted with their values.

In cases where the results are individual content notifications, either to fixed Broadcaster supplied designees, or using Consumer contact information, the same templates may be used however additional substitution values may be used and media attachments may be used. For instance an email may be sent to a Consumer informing them that they now have over 10,000 views and provide them a link to some electronic reward. Or a SMS may be sent to a group of Broadcasters or their designee(s) as soon a new video is curated with a "AAA" rating and the video is attached to the SMS.

As introduced above, still in FIG. 2, the Access Control subsystem (490) works in close concert with the Administration subsystem (410) for authentication (491), authorization (492), and API Credential (495) access. It may provide private or public Feed access (487) for Broadcaster needs in many areas of the Broadcaster ecosystem as noted in the description of Feeds, above. It may provide external access endpoints (arrows H) for Read/Write API (481) access (via arrow I) from both programmatic systems and websites or reduced functionality microsites (600 from FIG. 1).

Figure 3:
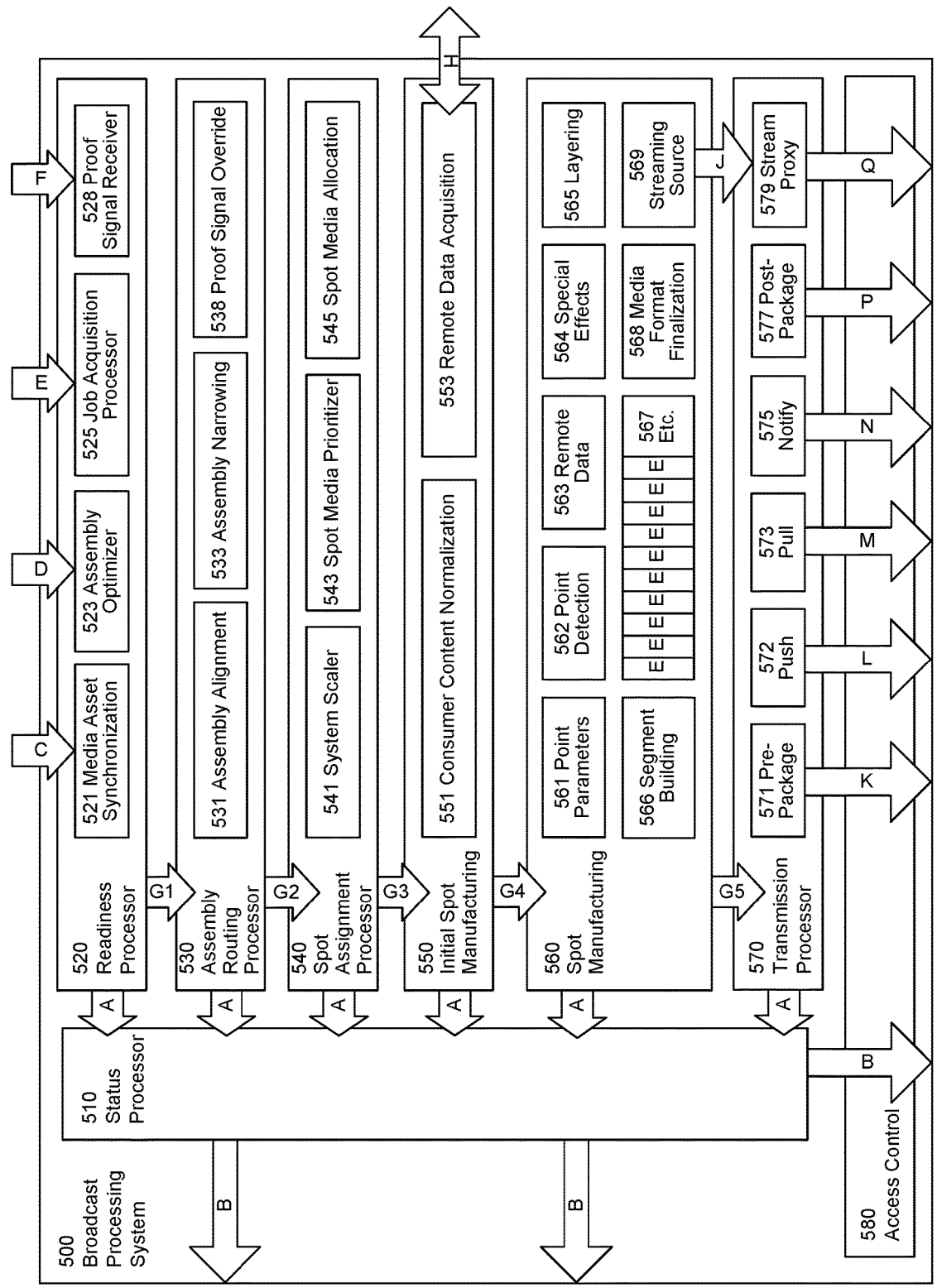
FIG. 3 is a block diagram illustrating an implementation of the rules-based processing system where media is made and delivered for broadcast.

In FIG. 3, the rules-based Broadcast Processing System (500) is described. At a high level, the assets, data, and work to be performed comes in at the top and receive processing at each subsystem phase moving down (arrows G1-5) the diagram until Spot Media is manufactured and transmitted (and/or made available) to the Broadcaster Media Systems (700). Along the way, status information may be made available to all surrounding systems.

The Status Processor (510 in FIG. 3) may be a conduit and routing channel for status updates. Messages come in from each subsystem (arrows A in FIG. 3) of the Broadcast Processing System (500). Example status updates which may be meaningful for different systems of the disclosed technology are error events, Spot Media processing beginning, percentage complete, transmission status, streaming status, system and subsystem health, system scale and capacity, etc. These messages may come in with a system target or may have a topic. Other systems (from FIG. 1, 200, 400, 600 via 400, 700, and 800-820 via 700) may subscribe to status topics to receive information (arrows B in FIG. 3) when such information is sent (arrows A in FIG. 3). Subscriptions may be regulated by access control rules especially with remote systems (700). Status information and alerts may have secondary categorization to topics so they are consumed by the appropriate system and/or Broadcaster. As an example, an error alert in a particular topic area may be visible and important to one Broadcaster using the system but entirely meaningless to another.

In FIG. 3, the Readiness Processor (520) polls, is signaled, or is directly sent information by controlling systems of the Broadcast Administrative System (400 from FIGS. 1 and 2). This may occur via HTTPS REST web interfaces.

The Media Asset Synchronization component (521) prepares, prepositions, and pre-processes Media Assets that are part of defined asset assemblies. The asset synchronization may be always on and works with the Media Asset Management service (461) and Spot Media Assembly Service (463) (via arrow C) to always have media assets and derivatives of media assets already transferred and materialized for immediate use in manufacturing assemblies. Derivatives and/or intermediate forms of media assets may be "pre-manufactured" to save time in the manufacturing process if these steps are commonly/repetitively undertaken. For instance if a Spot Media assembly calls for a resolution less than the source media asset and no loss will be reflected by downgrading the source media asset, then that downgraded derivative may be created once rather than for every Spot Media created. Creating it before any specific Spot Media requests will expedite Spot Media manufacturing.

The Assembly Optimizer (523 in FIG. 3) is an implementation of an expert system responsible for optimizing assembly outcomes defined by the Spot Media Assembly Service (463 in FIG. 2). The optimizer may be always on (e.g.— polling or being notified via arrow D) and incorporating any committed changes of the Spot Media Assembly Service (463). It may prepare a data structure that can be quickly used and evaluated by the Assembly Routing Processor (530 of FIG. 3) components to determine from a set of possible assemblies, which assemblies the Consumer content fulfills the required attributes (e.g.—square image vs. needing landscape HD video).

The Job Acquisition Processor (525 in FIG. 3) can regularly obtain all Spot Media Consumer content input sources from the UGC Routing Control and Spot Media Assembly Service (465 and 463 respectively in FIG. 2). These input sources are Feeds (487) and tie into assembly instructions. The Job Acquisition Processor may poll against the specified Feed Filter and may provide additional programmatic criteria in its query to only see updates since its last poll time. It can normally immediately dispatch acquired jobs to the Assembly Routing Processor (530) (via arrow G1).

The Proof Signal Receiver (528 in FIG. 3) may be a passive receptor of interactive communication from the Spot Media Proof (468 in FIG. 2) component. The message sent (in arrow F) can provide the specific assembly or assembly group and similar specific demonstrative content to use in place of real Consumer content. It will immediately dispatch a job tagged in some way as "testing" to the Assembly Routing Processor (530) (via arrow G1) with some special earmarking for the Proof Signal Override (538) component.

The Assembly Routing Processor (530 in FIG. 3) goal is to pair incoming (via arrow G1) Consumer content with zero or more specific manufacturing assemblies. If an optimized assembly filter is prepared by the expert system in the Assembly Optimizer (523) then that data structure or service can be used. Otherwise some purposefully rapid strategy for evaluating if the Consumer content meets the requirements of the set of assemblies needs to be employed. This may be accomplished by the Assembly Alignment (531) component. A second optional component may further Narrow (533) the eligible manufacturing assemblies. These narrowing steps may be fine-grained, unpredictable, or may require on-demand evaluation, which may prevent them from being turned into pre-established filters by the Assembly Optimizer (523). Detailed examples of this are provided in the UGC Routing Control (465 in FIG. 2) component described above. If one or more assemblies are matched, then these are sent to the Spot Assignment Processor (via arrow G2). These narrowing functions may require further functions such as the determination of a geographic location from an IP address to determine if the assembly can be applied based on that Consumer location. Another example may be the results of a randomization function. Another example implementation may require a time of day where the server submission time must be adjusted to the timezone of the submitting Consumer.

The Proof Signal Override (538) component provides a "short-circuit" to the logic requirements of the Assembly Alignment and Assembly Narrowing (531 and 533) components. It may assign the prescribed assembly routing information received by the Proof Signal Receiver (528) and sends the work to the Spot Assignment Processor (via arrow G2).

Within the Spot Assignment Processor subsystem (540 of FIG. 3) there are active components that may be always on. The first is the System Scaler (541). The System Scaler is an optional component but important for handling large and small Spot Media manufacturing workloads. It may not handle Spot Media itself, but may track all workloads, system utilization, expected duration of those workloads, predicted anticipation of future workloads, and have a computed overall capacity representation and future capacity needs. Compute and/or memory may need to be reserved on a per assembly or categorization of assembly type. (One type of assembly may require twice the server memory of another.) These may be evaluated in lazy fashion or using profiling. Workloads and available resources may be concerned with compute power or available memory or both.

The System Scaler (541) may be tuned for economic or high-performance by targeting an ideal capacity level. An economic target may be to operate at or near 80-120% capacity so that minimal server resources are ever left unused. A high-performance target may be a server capacity of 20-50% so that there is never a wait before Spot Manufacturing can begin. The System Scaler may be capable to creating or removing and/or allocating or de-allocating compute resources for manufacturing. The compute demands on the manufacturing, amount of time it takes to instantiate those compute resources, the future anticipated need for those resources, and the capacity target model all reflect how frequently the System Scaler (541) will operate.

The Spot Media Prioritizer (543 in FIG. 3) may be an optional component of the Spot Assignment Processor. Unlike normal atomic server operations, manufacturing workloads may not be easily interrupted. When workloads are fully booked and/or capacity is constrained beyond what the System Scaler can provide, the prioritizer can look at expected manufacturing time, current workloads, and the time workloads have been waiting, and can derive and constantly revise a workload structure which provides increased Spot Media production throughput but diminishes starvation, or extended delay of Spot Media.

The Spot Media Allocation component (545 in FIG. 3) may determine which workload is assigned to which server compute resource. The allocation of Spot Media workloads can be influenced by resources coming online or going offline (per 541). The allocation can also be influenced by intelligent scheduling and prioritization of workloads (543). In some implementations, keeping workloads driven by the same Consumer content on the same manufacturing server may be ideal and in some implementations it may be less efficient. The assignment of Spot Media workloads is reflected by arrow G3.

In some implementations, Initial Spot Manufacturing (550) may only occur once for each form of Consumer content. This is a computational optimization. The first form of work is Consumer Content Normalization (551). Examples of this normalization phase may include truncating audio and/or video for length, adjusting the average decibel level of the audio track(s), scaling the pixel density of video or images, cropping images or video for dimensions, "auto-fixing" picture quality, adjusting brightness or contrast, increasing or decreasing color palettes, "loss-less" conversion of file formats to an internal format, etc. Further possible optimizations may reflect some or all of this normalization work (551) may be done in advance of the entire Broadcast Processing System (500) even if the work is never used.

In implementations where manufacturing assemblies make use of the Remote Data Utility (462 in FIG. 2) control service the corresponding processing service, the Remote Data Acquisition (553 in FIG. 3), makes on-demand calls to the 3rd party systems (arrow H in FIG. 3) for the remote data (such as text strings and/or images) using the declared instructions and saves that data along with any normalized forms of Consumer content. In most implementations using remote data, the data needs to be retrieved as late in the Spot Media manufacturing process as possible. If that is not the case, some implementations may be able to do these operations earlier and in other cases and implementations, these operations may be able to be performed for large swaths of Spot Media.

After Initial Spot Manufacturing (550 in FIG. 3) occurs, the main manufacturing workload(s) of defined Spot Media assemblies may be signaled to begin (via arrow G4 in FIG. 3) in the Spot Manufacturing subsystem (560). This subsystem may be within the same context as the Initial Spot Manufacturing workload or in a different server context. This workload may be for a single Spot Media output or multiple Spot Media forms if more optimal, due to shared intermediate work or shared file processing.

The Spot Manufacturing subsystem (560 in FIG. 3) may consist of a large variety of pluggable implementations of capable of meeting the diverse needs of the defined manufacturing assemblies in a diverse universe of Consumer content. It can be noted that in some implementations, Consumer content may be changed from one content form to another. An example of this could be the transformation of content from portrait to landscape with the addition of black bars or reflected blurred imagery. Another example could be the transformation of a series of images into a video with transitions.

The Spot Manufacturing process may be pipelined to allow for pluggable components capable of operating and implementing the required and defined assembly for a spot. The media storage model may be in memory and may imply that all pipelined components can operate in the same server context. The individual components may be simple or complex where the sum of the operations is more than the individual parts (567). FIG. 3 contains a representative example of pluggable Spot Manufacturing (560) components that may operate in series. Of course, a component may or may not need to operate given a Consumer's particular content and/or the assembly and/or the Media Format and/or the transmission method. An example Point Parameters pluggable component (561) may be relayed from Consumer input and operated on (such as specifying where a lens flare can start and end from, or what person can be turned blue, or whose head can be warped into a team mascot, etc.). Such a component may operate on the content and pass to the next component. A second example pluggable component may provide services to automatically detect points (562) in a face (e.g. eyebrows, lips, contours, eyes, etc.) or provide a skeletal representation of human forms, or detect corporate logos, etc. These automatically detected points may be operated on as if the Consumer supplied them as point parameters. As an example, faces could be made into mascots, logos could be obscured, lightning or fire could burst from figures hands or eyes, etc. The Remote Data component (563) will allow the interjection of content at a time and/or place proscribed in the assembly. It may involve a simple addition of the current standings of the Consumer's favorite team, the current score of a sports contest, the addition of text supplied by a user, a detailed ingredient list for a Consumer's favorite pie, the current availability of a product only available for purchase via a television program, imagery for a weather forecast, etc. An example of Special Effects (564) could be the scaling and repositioning of a Consumer into a different space of a video, blurring or warping, coloring or color isolating, edge detecting, transitioning, rotating, etc. Special effects may apply not just to images and video, but also to audio. For instance, a Consumer's voice could be changed to sound like a popular character in a television program. Layering (565) component examples may involve the addition of a transparent images or video on top of Consumer image or video. An example of this may be placing a border, cloud, or animated logo, news crawler, or placing the user into a scene. Or it may involve the addition of 2D, 2.5D, 3D, or video objects relative to specified point parameters. This may be like adding a mustache to a person or applying a beauty filter that understands skin tone and only operates on faces. Or it may be applying cosmetics or costumes or explosions or birds circling a person's head. Or it may allow for your favorite soccer goalie to appear with the Consumer. Layering may also allow for the Consumer to submit video, which is then treated as having a "green screen" where that color is subtracted. Then it may allow for an "underlay video" or "underlay image" to be applied under the other layers. Segment Building (566) is an example component, which allows Media Assets to be combined by prepending or appending content such as adding an "intro video" and/or "outro video" to a Consumer video where the result of the combination is to place the Consumer in a full 30-second advertisement or the outro credit reel of a television program. The Media Format Finalization (568) component may take the control instructions of the Broadcast Media Ingestion Requirements and Media Format components (471 and 472 from FIG. 2) to create, transform, or transcode the existing memory representation into a physical file format or collection of files in a format (such as HLS). In some implementations and Content forms supporting streaming, a Streaming Source (569) can be provided as directed by the controlling Transmission Transport (475) control service. This could make audio or video frames immediately available to a Streaming Proxy Server (579) (via arrow J) and Notify a Broadcaster Media System (700) (via arrow N) that the stream is available for consumption (via arrow Q).

The Transmission Processor (570 in FIG. 3) implements the control directives of the Integration Control subsystem (470 in FIG. 2). It provides for Pre-Package (571) operations to be carried out before any Spot Media is delivered and for Post-Package (577) operations to be carried out after Spot Media is delivered. These are defined by the Broadcast Media Ingestion Package (478) service. These may require system access and the application of template values within scripting systems. These may also require the retrieval and/or invocation of remote assets or services (such as a variation on a normal notification service like sending an email). Failures may not normally cause Spot Media to be invalidated, but may trigger error alerts through the status system.

The Transmission Processor also may provide for common Push (572) or Pull (573) operations as defined by the Transmission Transport (475) control service. Spot Media content can be propositioned and verified prior to any Notification (575) message (arrow N) to a Broadcast Media System (700) that it may Pull (573) to ensure it will be available and deliverable (possibly through arrow M or its logical peer). Implementations can beware of intrinsically delayed 3rd-party distribution services. Following a successful Push (572) to the specified Broadcast Media System (700) (via arrow L) the system may notify (575) the recipient broadcaster system (via arrow N) of delivery. If the Push is not successful after a suitable number of retries, the Notification (575) can be explicit in its failure and can signal an error status alert (via arrow A).

The Access Control subsystem (580 of FIG. 3) of the Broadcast Processing System (500) may be identical and may be shared with the Access Control subsystem (490 of FIG. 2) of the Broadcast Administrative System (410). Like that subsystem it can include API Credentials. It may or may not support non-programmatic access, so Authentication may or may not be required. Authorization and access roles and restrictions can however apply.

Figure 4:
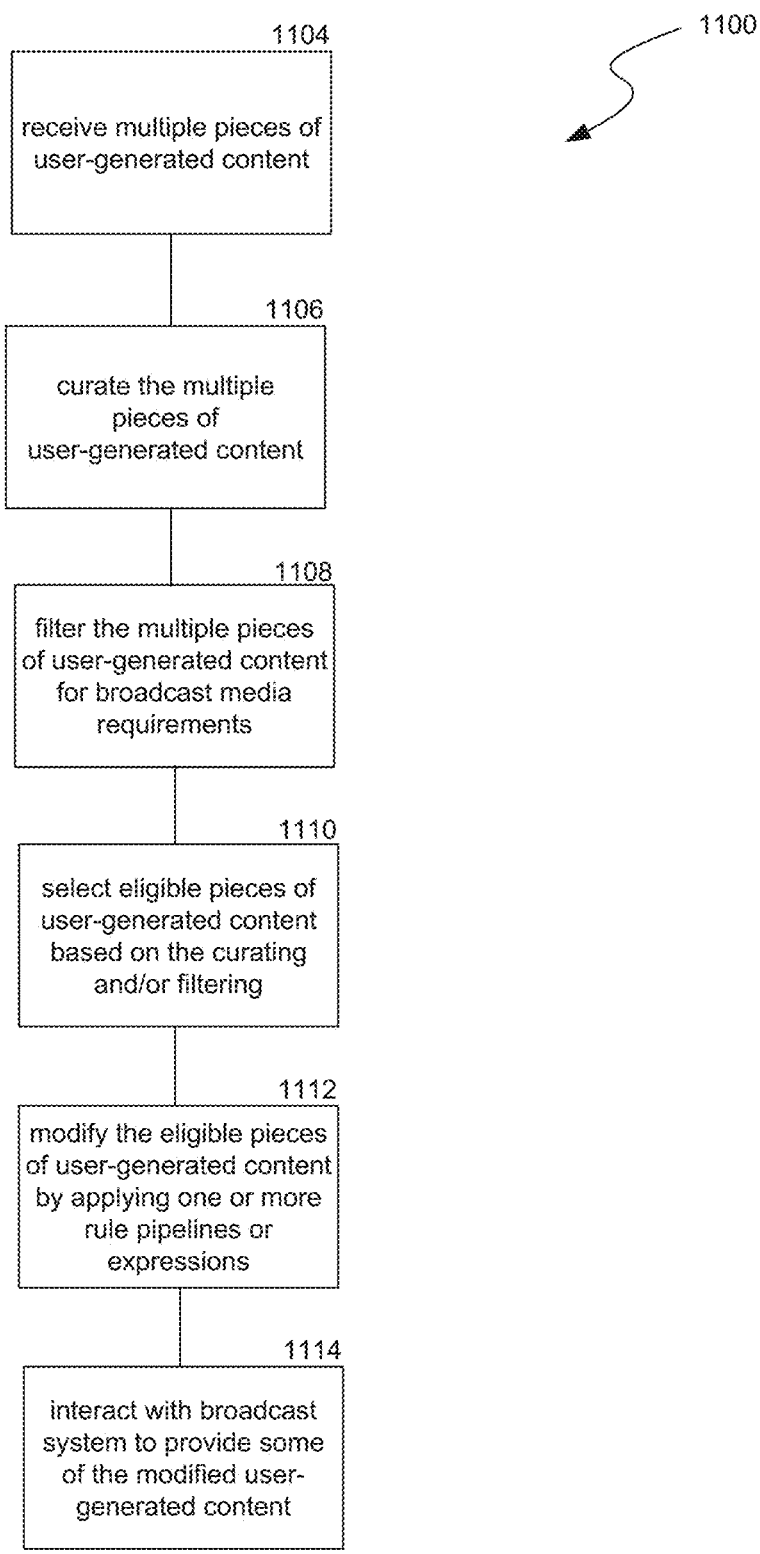
FIG. 4 is a flow diagram illustrating a process used in some implementations for transforming user-generated content for incorporation into broadcast media.

FIG. 4 is a flow diagram illustrating a process 1100 used in some implementations for transforming user-generated content for incorporation into broadcast media. In various implementations, process 1100 can be performed by aspects of modules 400 and 500. While particular features of modules 400 and 500 are called out below in relation to steps of process 1100, other components described herein can facilitate and operate in conjunction with the identified features. For example, though not specifically described below, administration 410, integration control 470, feeds and APIs 480, and Access Control 490 can interact with, control, and pass data between other operations described below for system 400. Similarly, though not specifically described below, status processor 510, readiness processor 520, assembly routing processor 530, transmission processor 570, and access control 580 can interact with, control, and pass data between other operations described below for system 500.

At block 1104, process 1100 can receive multiple pieces of user-generated content. In some implementations, at least some of the user-generated can be generated by users on mobile devices for inclusion in broadcast media. User-generated content can be received at broadcast administrative system 400, via consumer device interfaces 100 and through step 2B.

At block 1106, process 1100 can curate the multiple pieces of user-generated content. In some implementations, curation can include applying one or more ratings, categorizations, or tags to the multiple pieces of user-generated content. In some implementations, curation can be performed using curation 430 and/or analytics 450.

At block 1108, process 1100 can filter the multiple pieces of user-generated content such that only user-generated content verified as satisfying requirements for broadcast media are used in following steps of process 1100. In some implementations, the filtering can be performed using moderation 420, media asset management 461, integration control 470, spot assignment processor 540, and/or initial spot manufacturing 550.

At block 1110, process 1100 can select at least one eligible piece of user-generated content from the multiple pieces of user-generated content. In various implementations, the selection of eligible pieces of user-generated content can be based on one or both of the curating and verifying performed at blocks 1106 and 1108.

At block 1112, process 1100 can apply one or more rules to modify at least one of the selected eligible pieces of user-generated content. In some implementations, the applying rules can be performed using manufacturing 460, integration control 470, assembly routing processor 530, initial spot manufacturing 550, spot manufacturing 560, and/or other aspects of broadcasting system 500.

In some implementations, multiple rules can be combined into expressions and/or one or more rules can be defined in a pipeline, defining a sequence of rules to be applied. In some implementations, expressions can be defined with logic controlling which rules of the expression are applied, e.g. based on the form of user-generated content, input received from a previous stage in a pipeline, context identified for the user-generated content, aspects of the broadcast media for which the user-generated content is being modified, etc. The result of the modifications at block 1112 can transform at least some of the eligible pieces of user-generated content into a form suitable for inclusion in broadcast media, e.g. by converting the content form (e.g. converting images to video, adding sound, etc.), adding overlays, removing or blurring objects, changing content aspects (e.g. size, resolution, rotation, brightness, etc.), adding 3rd party data, etc. In some implementations, at least one of the multiple rules was defined by a broadcast system;

At block 1114, process 1100 can interact with the broadcast system to provide at least one of the modified pieces of user-generated content. In some implementations, at least some of the provided user-generated content is incorporated in a broadcast presentation, such as a television episode broadcast, a commercial, a movie, an Internet streaming broadcast, etc. In some implementations, interacting with the broadcast system can be performed using transmission processor 570 and/or access control 580.

Figure 5:
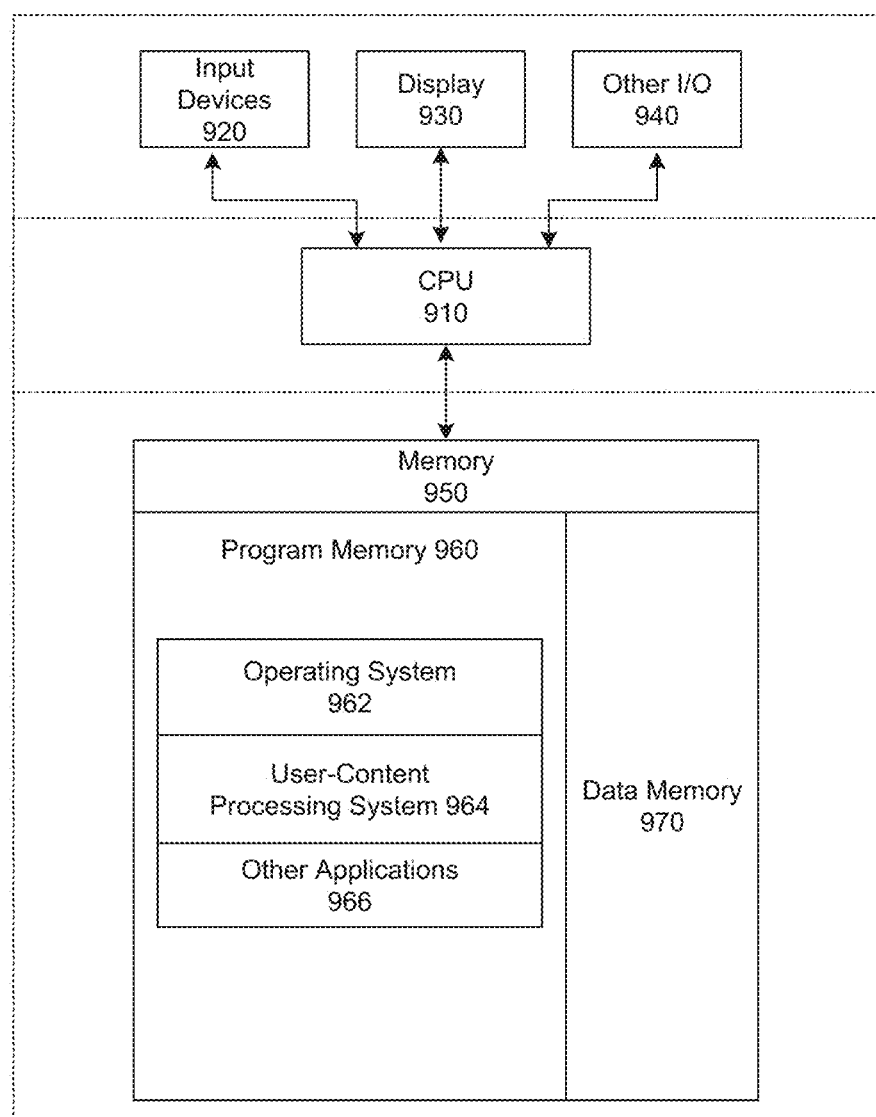
FIG. 5 is a block diagram illustrating an overview of devices on which some implementations of the disclosed technology can operate.

FIG. 5 is a block diagram illustrating an overview of devices on which some implementations of the disclosed technology can operate. The devices can comprise hardware components of a device 900. In some implementations, device 900 can be a device that can transform user-generated content based on one or more rules, e.g. defined by a broadcasting system, for inclusion in a broadcast presentation. In some implementations, device 900 can be a user device that provides user-generated content to other versions of device 900. Device 900 can include one or more input devices 920 that provide input to the Processor(s) 910 (e.g. CPU(s), GPU(s), HPU(s), etc.), notifying it of actions. The actions can be mediated by a hardware controller that interprets the signals received from the input device and communicates the information to the processors 910 using a communication protocol. Input devices 920 include, for example, a mouse, a keyboard, a touchscreen, an infrared sensor, a touchpad, a wearable input device, a camera- or image-based input device, a microphone, or other user input devices.

Processors 910 can be a single processing unit or multiple processing units in a device or distributed across multiple devices. Processors 910 can be coupled to other hardware devices, for example, with the use of a bus, such as a PCI bus or SCSI bus. The processors 910 can communicate with a hardware controller for devices, such as for a display 930. Display 930 can be used to display text and graphics. In some implementations, display 930 provides graphical and textual visual feedback to a user. In some implementations, display 930 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 940 can also be coupled to the processor, such as a network card, video card, audio card, USB, firewire or other external device, camera, printer, speakers, CD-ROM drive, DVD drive, disk drive, or Blu-Ray device.

In some implementations, the device 900 also includes a communication device capable of communicating wirelessly or wire-based with a network node. The communication device can communicate with another device or a server through a network using, for example, TCP/IP protocols. Device 900 can utilize the communication device to distribute operations across multiple network devices.

The processors 910 can have access to a memory 950 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 950 can include program memory 160 that stores programs and software, such as an operating system 962, user-content processing system 964, and other application programs 966. Memory 950 can also include data memory 970 that can include data objects such as rules and user-generated content, configuration data, settings, user options or preferences, etc., which can be provided to the program memory 960 or any element of the device 900.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 6:
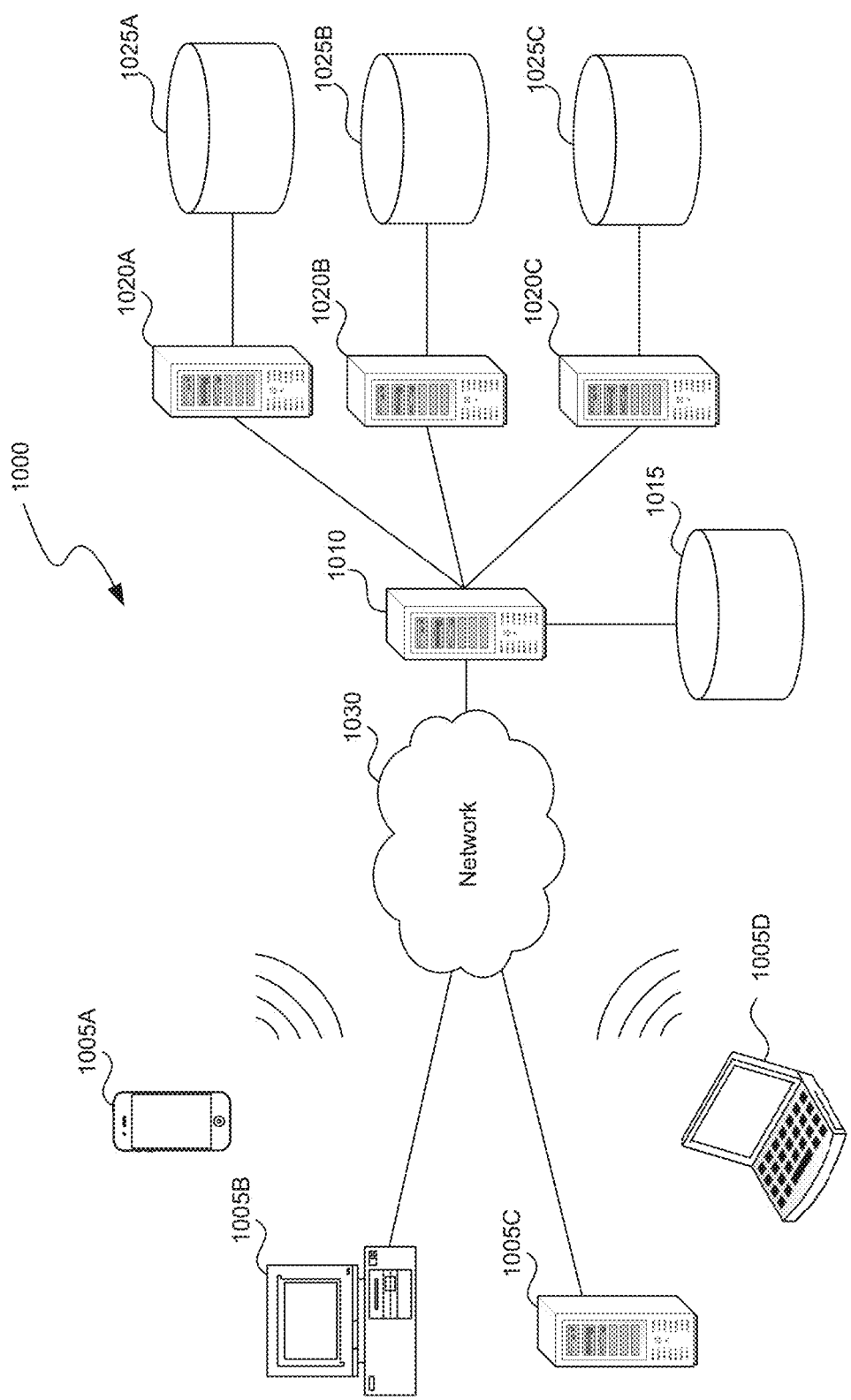
FIG. 6 is a block diagram illustrating an overview of an environment in which some implementations of the disclosed technology can operate.

FIG. 6 is a block diagram illustrating an overview of an environment 1000 in which some implementations of the disclosed technology can operate. Environment 1000 can include one or more client computing devices 1005A-D, examples of which can include device 900. In some implementations, client computing devices 1005A-D can supply user-generated content to Server computing devices 1010 and 1020. Client computing devices 1005 can operate in a networked environment using logical connections 1010 through network 1030 to one or more remote computers, such as a server computing device.

In some implementations, server 1010 can be an edge server which receives client requests and coordinates fulfillment of those requests through other servers, such as servers 1020A-C. Server computing devices 1010 and 1020 can comprise computing systems, such as device 900. In some implementations, server computing devices 1010 and 1020 can include one or more of modules 100-600. Though each server computing device 1010 and 1020 is displayed logically as a single server, server computing devices can each be a distributed computing environment encompassing multiple computing devices located at the same or at geographically disparate physical locations. In some implementations, each server 1020 corresponds to a group of servers.

Client computing devices 1005 and server computing devices 1010 and 1020 can each act as a server or client to other server/client devices. Server 1010 can connect to a database 1015. Servers 1020A-C can each connect to a corresponding database 1025A-C. As discussed above, each server 1020 can correspond to a group of servers, and each of these servers can share a database or can have their own database. Databases 1015 and 1025 can warehouse (e.g. store) information. Though databases 1015 and 1025 are displayed logically as single units, databases 1015 and 1025 can each be a distributed computing environment encompassing multiple computing devices, can be located within their corresponding server, or can be located at the same or at geographically disparate physical locations.

Network 1030 can be a local area network (LAN) or a wide area network (WAN), but can also be other wired or wireless networks. Network 1030 may be the Internet or some other public or private network. Client computing devices 1005 can be connected to network 1030 through a network interface, such as by wired or wireless communication. While the connections between server 1010 and servers 1020 are shown as separate connections, these connections can be any kind of local, wide area, wired, or wireless network, including network 1030 or a separate public or private network.

An example use of the disclosed technology could involve a broadcast television show's introduction. During the introduction of the show, the broadcast audience is invited to participate, via a cosmetically pleasing URL, to record and share a video of themselves where a branded and augmented filter is added that inserts the Consumer as a cameo appearance in the shows introduction itself. The Consumer shares the video of themself across their own social platforms and they simultaneously submit their video for use on air as part of the broadcast introduction for the next episode of the show. One or more consumer videos are selected and appear as part of the show introduction during the next episode. This elevates the entire experience for the audience and increases live tune-in of the show each episode.

Another example use would be to invite the broadcast audience to participate during the first commercial break, then have creative which features something that happened or will happen in the episode. The Consumer would record their reaction and have an opportunity to be chosen and have their branded reaction in the next commercial break.

Placing the Consumer's Spot Media in a standalone commercial break is an interesting example, however it is not technically different than placing the Consumer in a cameo appearance within the episode of the show. As long as the show Media Assets are available, the special effects in the Spot Media can place the Consumer in a segment of the show episode. They may appear in the background of main actors, as a cut-away wearing a special effects-applied costume, as a framed picture on a wall, in a party scene, etc. One or several Consumer's Spot Media may appear as part of an "out-takes" credit reel, or an ever-changing intro scenes where they interact with components and/or characters in the show. The audience sees the content they create and share it across their own social platforms and simultaneously submits the content for use on air as part of the live broadcast cameo appearance into that episode of the show. One Consumer submission is selected and used as Spot Media as part of that episode of the show. This may elevate the entire experience for the audience and may increase live viewership of the show each episode.

Another example would be allowing fans at home while watching live sports events to submit their own "fan cam" celebrations for goals, costumes, etc. Or they could play the role of an announcer, and/or appear as a special segment, which an announcer kicks off as if they're talking about a celebrity. This allows greater participation and engagement and can also be a commercially sponsored segment.

Another example may be the audience sees, at the beginning of a broadcast commercial, a broadcast bug inviting them to a vanity URL and/or QR code where they shoot and share a "selfie" video of themselves dancing with branding from a candy company. A branded filter then may show the Consumer dancing with a music pop star as colorful candy raindrops fall on the Consumer and pop star during their "candy rain dance". The audience shares these videos across their own social platforms and simultaneously submits the content for use in a Broadcast commercial. One Consumer submission is selected and used as part of the commercial when it airs a second time during the show (e.g., the Consumer is inserted into the Broadcast commercial to be dancing with the pop star on air) thus elevating the entire experience for the broadcast audience and increasing live tune-in during commercial breaks.

In general, the system described herein provides a digital, white-label solution that offers "in-product consumer sharing" for consumers and brand safety and republishing capabilities for brands. The system can be inserted into a brand's digital or physical products and channels. Once embedded, it facilitates seamless sharing right from within the products; consumers can create content with fun, branded filters and share that content across any social and messaging platform. Furthermore, the system provides the brand-safety and control, republishing and analytics capabilities needed to ensure the consumer-created content is safe across all channels, on-brand and delivering engagement results.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

The above Detailed Description of examples is not intended to be exhaustive or to limit the invention to the precise form disclosed above. While specific examples are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for transforming user-generated content for incorporation into broadcast media, the method comprising:
   receiving multiple pieces of user-generated content, wherein at least one of the multiple pieces of user-generated content was generated on a mobile device for inclusion in broadcast media;
   curating the multiple pieces of user-generated content to apply one or more ratings, categorizations, or tags to the multiple pieces of user-generated content;
   verifying whether each piece of the multiple pieces of user-generated content satisfies requirements for broadcast media;
   based on the curating and verifying, selecting at least one eligible piece of user-generated content from the multiple pieces of user-generated content;
   determining a substance of a portion of the broadcast media;
   applying one or more pipelines or expressions to modify at least one of the selected at least one eligible pieces of user-generated content,
      wherein the modification includes combining the portion of the broadcast media with the at least one of the selected at least one eligible pieces of user-generated content such that:
         the at least one of the selected at least one eligible pieces of user-generated content is transformed to match the determined substance; and
         the combination of the portion of the broadcast media and the transformed at least one of the selected at least one eligible pieces of user-generated content are displayed at the same time;
      wherein each pipeline or expression comprises multiple rules, and
      wherein at least one of the multiple rules was defined by a broadcast system; and
   interacting with the broadcast system to provide at least one of the modified pieces of user-generated content, wherein at least some of the provided user-generated content is incorporated in a broadcast presentation.

2. The method of claim 1,
   wherein the broadcast presentation was begun prior to the generation of at least some of the multiple pieces of user-generated content;
   wherein the broadcast presentation includes a URL or QR code for submitting user-generated content; and
   wherein the receiving at least some of the multiple pieces of user-generated content is accomplished as a result of users using the URL or QR code.

3. The method of claim 1,
   wherein the multiple pieces of user-generated content each comprise one or more of video, audio, an image, or any combination thereof;
   wherein the modified user-generated content comprises video; and
   wherein the broadcast presentation is a live television presentation.

4. The method of claim 1 further comprising providing, to a device that provided a particular piece of user-generated content, a link to the modified version of the particular piece of user-generated content, wherein the link is configured for inclusion in a social media system such that the link permits the modified version of the particular piece of user-generated content to be viewed through the social media system.

5. The method of claim 1,
   wherein curating the user-generated content comprises obtaining analytics, for at least two pieces of the multiple pieces of user-generated content, specifying a level of interaction with the at least two pieces of user-generated content in one or more social media systems; and
   wherein only a first of the at least two pieces of user-generated content is one of the selected at least one eligible pieces of user-generated content based on the analytics for the first piece of user-generated content being above a threshold or being greater than the analytics for the others of the at least two pieces of user-generated content.

6. The method of claim 1, wherein the verifying comprises filtering out, from the eligible pieces of user-generated content, content identified to have objectional material identified by applying one or more machine learning models trained to identify one or more of adult material, offensive material, specified products, or specified logos.

7. The method of claim 1, wherein the verifying comprises filtering out, from the eligible pieces of user-generated content, content identified to have specified material or type of material.

8. The method of claim 1,
wherein at least one of the multiple rules specifies one or more media items to incorporate into user-generated content such that the modification, when applying the at least one of the multiple rules, generates a video that shows the one or more media items in association with the user-generated content; and
wherein the one or more media items comprise one or more of: an intro video, an outro video, a video overlay, a video underlay, or a product image.

9. The method of claim 1, wherein at least one of the multiple rules specifies one or more media items to incorporate into user-generated content such that the modification, when applying the at least one of the multiple rules, generates a video that shows the one or more media items in association with the user-generated content.

10. A non-transitory computer-readable storage medium storing instructions that, when executed by a computing system, cause the computing system to perform operations for transforming user-generated content for inclusion with broadcast media, the operations comprising:
receiving multiple pieces of user-generated content, wherein at least one of the multiple pieces of user-generated content was generated for inclusion in broadcast media;
verifying whether each piece of the multiple pieces of user-generated content satisfies requirements for broadcast media;
based on the verifying, selecting at least one eligible piece of user-generated content from the multiple pieces of user-generated content;
applying one or more pipelines or expressions, each pipeline or expression comprising multiple rules, to modify at least one of the selected at least one eligible pieces of user-generated content,
wherein each pipeline or expression comprises multiple rules,
wherein the modifications transform the at least one of the eligible pieces of user-generated content into a form suitable for inclusion in broadcast media, and
wherein at least one of the multiple rules was defined by a broadcast system;
interacting with the broadcast system to provide at least one of the modified pieces of user-generated content, wherein at least some of the provided user-generated content is to be included with a broadcast presentation and
providing, to a device that provided a particular piece of user-generated content, a link to the modified version of the particular piece of user-generated content, wherein the link is configured for inclusion in a social media system such that the link permits the modified version of the particular piece of user-generated content to be viewed through the social media system.

11. The computer-readable storage medium of claim 10, wherein the multiple rules, of the one or more pipelines or expressions, are based on a spot media template created by the broadcast system that specifies a format that modified user-generated content must be in for inclusion in the broadcast presentation.

12. The computer-readable storage medium of claim 10,
wherein at least a first of the received multiple pieces of user-generated content is in a first form and at least a second of the received multiple pieces of user-generated content is in a second different form;
wherein at least a first one of the one or more pipelines or expressions applied to modify the first of the received multiple pieces of user-generated is selected base on a first directive that maps the first form to a first output format that will be generated when the first form is provided as input to the selected first at least one pipeline or expression; and
wherein at least a second one of the one or more pipelines or expressions applied to modify the second of the received multiple pieces of user-generated is selected base on a second directive that maps the second form to a second output format that will be generated when the second form is provided as input to the selected second at least one pipeline or expression.

13. The computer-readable storage medium of claim 10, wherein the one or more pipelines or expressions require input content in a particular form and wherein the method further comprises, prior to applying the one or more pipelines or expressions, normalizing at least some of eligible pieces of user-generated content to be in the particular form by performing one or more of:
truncation;
volume normalization;
pixel density adjustment;
cropping;
brightness adjustment; or
any combination thereof.

14. The computer-readable storage medium of claim 10,
wherein the one or more pipelines or expressions comprise an expression with logic specifying one or more conditions for successful application of the expression;
wherein the logic specifies particular ones of the multiple rules of that expression that must be successfully applied for the conditions to be met; and
wherein the modified at least one of the user-generated content is eligible for provision to the broadcast system in response to a determination that the expression was successfully applied.

15. The computer-readable storage medium of claim 14,
wherein at least some of the multiple rules for the expression are grouped into at least two groups; and
wherein the logic specifies that at least one rule from each of the at least two groups must be successful for the conditions to be met.

16. The computer-readable storage medium of claim 10, wherein conditions are applied for allowing users to submit the user-generated content including one or more of:
requiring the user-generated content to be submitted from a specified bounded location;
requiring the user-generated content to be submitted during a particular time window;
requiring the user-generated content to be submitted in association with a user with identified affinities in a social media system;
requiring the user-generated content to be associated with a user having specified demographic information; or
any combination thereof.

17. A system for transforming user-generated content for incorporation into broadcast media, the system comprising:
one or more processors;
a memory;
a broadcast administrative system; and a broadcast processing system;
wherein the broadcast administrative system and broadcast processing system are configured to:
- receive multiple pieces of user-generated content, wherein at least one of the multiple pieces of user-generated content was generated for inclusion in broadcast media;
- automatically select at least one eligible piece of user-generated content from the multiple pieces of user-generated content, wherein the automatic selecting is performed by
  - obtaining analytics, for at least two pieces of the multiple pieces of user-generated content, specifying a level of interaction with the at least two pieces of user-generated content in one or more social media systems;
  - wherein only a first of the at least two pieces of user-generated content is one of the selected at least one eligible pieces of user-generated content based on the analytics for the first piece of user-generated content being above a threshold or being greater than the analytics for the others of the at least two pieces of user-generated content;
- apply multiple rules to modify at least one of the selected at least one eligible pieces of user-generated content,
  - wherein the modifications transform the at least one of the eligible pieces of user-generated content into a form suitable for inclusion in broadcast media; and
- interact with a broadcast system to provide at least one of the modified pieces of user-generated content, wherein at least some of the provided user-generated content is incorporated in a broadcast presentation.

18. The system of claim 17, wherein applying at least one of the multiple rules comprises modifying the selected at least one eligible pieces of user-generated content by applying a special effect including one or more of:
- adjusting scaling and orientation;
- adding text or a graphics overlay;
- cropping to fit within a specified frame;
- adding a costume or clothing to a person depicted in the user-generated content;
- applying coloring or color isolating; or
- any combination thereof.

19. The system of claim 17, wherein applying at least one of the multiple rules comprises modifying the selected at least one eligible pieces of user-generated content by adding a layer including one or more semi-transparent images or videos on top of the user-generated content.

20. The system of claim 17, wherein the multiple rules are configured to be applied to produce different modifications based on a specified context of the broadcast presentation, wherein the specified context is based on whether the broadcast presentation is: a television show, a movie, a segment within a television show, for a particular product, or for a particular brand.

* * * * *

UNITED STATES PATENT AND TRADEMARK OFFICE
CERTIFICATE OF CORRECTION

PATENT NO.           : 10,652,632 B2
APPLICATION NO.      : 16/126995
DATED                : May 12, 2020
INVENTOR(S)          : John Clayton Webster et al.

Page 1 of 1

It is certified that error appears in the above-identified patent and that said Letters Patent is hereby corrected as shown below:

In the Specification

In Column 5, Line 53, delete "(10)" and insert -- (1C) --, therefor.

In Column 21, Line 19, delete "curated," and insert -- curated. --, therefor.

In Column 27, Line 36, delete "system;" and insert -- system. --, therefor.

In Column 27, Line 42, delete "Internet" and insert -- internet --, therefor.

In Column 31, Line 43, after "elements" insert -- . --.

In the Claims

In Column 34, Line 11, in Claim 12, after "user-generated" insert -- content --.

In Column 34, Line 18, in Claim 12, after "user-generated" insert -- content --.

Signed and Sealed this
Seventh Day of July, 2020

Andrei Iancu
*Director of the United States Patent and Trademark Office*